United States Patent
Kim et al.

(10) Patent No.: US 10,581,833 B2
(45) Date of Patent: Mar. 3, 2020

(54) ELECTRONIC DEVICE AND METHOD FOR PROCESSING SECURE INFORMATION

(71) Applicant: Samsung Electronics Co., Ltd., Gyeonggi-do (KR)

(72) Inventors: Yu Seung Kim, Seoul (KR); In Ku Kang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 277 days.

(21) Appl. No.: 15/041,803

(22) Filed: Feb. 11, 2016

(65) Prior Publication Data

US 2016/0241548 A1 Aug. 18, 2016

(30) Foreign Application Priority Data

Feb. 13, 2015 (KR) ........................ 10-2015-0022739

(51) Int. Cl.
| | |
|---|---|
| H04L 29/06 | (2006.01) |
| H04W 12/08 | (2009.01) |
| G06F 21/74 | (2013.01) |
| G06Q 20/34 | (2012.01) |
| G06F 21/62 | (2013.01) |
| H04L 9/32 | (2006.01) |

(52) U.S. Cl.
CPC .......... *H04L 63/0838* (2013.01); *G06F 21/62* (2013.01); *G06F 21/74* (2013.01); *G06Q 20/35765* (2013.01); *H04L 63/105* (2013.01); *H04W 12/08* (2013.01); *H04L 9/3228* (2013.01)

(58) Field of Classification Search
CPC . H04L 63/0838; H04L 63/105; H04L 9/3228; G06F 21/62; G06F 21/74

USPC ........................................................ 726/5, 7
See application file for complete search history.

(56) References Cited

U.S. PATENT DOCUMENTS

| | | |
|---|---|---|
| 7,240,192 B1 | 7/2007 | Paya et al. |
| 7,743,409 B2 | 6/2010 | Gonzalez et al. |
| 7,748,031 B2 | 6/2010 | Gonzalez et al. |
| 8,140,843 B2 | 3/2012 | Holtzman et al. |
| 8,220,039 B2 | 7/2012 | Gonzalez et al. |
| 8,245,031 B2 | 8/2012 | Holtzman et al. |
| 8,266,711 B2 | 9/2012 | Holtzman et al. |
| 8,370,529 B1 | 2/2013 | Hansen |
| 8,590,030 B1 * | 11/2013 | Pei ...................... H04L 63/0838 726/9 |

(Continued)

FOREIGN PATENT DOCUMENTS

WO WO 2008/013655 1/2008

OTHER PUBLICATIONS

Riva, "Progressive authentication: deciding when to authenticate on mobile phones", 2012, USENIX, pp. 1-16 (Year: 2012).*

(Continued)

*Primary Examiner* — Alexander Lagor
*Assistant Examiner* — Gregory A Lane
(74) *Attorney, Agent, or Firm* — The Farrell Law Firm, P.C.

(57) ABSTRACT

An electronic device and a method for operating the electronic device are provided. The method includes obtaining first information in a first zone of the electronic device, extracting second information included in the first information in the first zone of the electronic device, and storing the second information in a second zone of the electronic device that has a higher level of security than a level of security of the first zone.

16 Claims, 16 Drawing Sheets

(56) References Cited

U.S. PATENT DOCUMENTS

| | | |
|---|---|---|
| 8,613,103 B2 | 12/2013 | Holtzman et al. |
| 8,639,939 B2 | 1/2014 | Holtzman et al. |
| 8,863,252 B1 * | 10/2014 | Katzer .................. G06F 21/53 |
| | | 726/5 |
| 9,208,354 B2 | 12/2015 | Lal et al. |
| 2007/0011724 A1 | 1/2007 | Gonzalez et al. |
| 2007/0016941 A1 | 1/2007 | Gonzalez et al. |
| 2007/0083768 A1 * | 4/2007 | Isogai .................... G06F 21/51 |
| | | 713/189 |
| 2007/0234064 A1 * | 10/2007 | Nihei .................... G06F 21/34 |
| | | 713/183 |
| 2008/0010449 A1 | 1/2008 | Holtzman et al. |
| 2008/0010450 A1 | 1/2008 | Holtzman et al. |
| 2008/0010451 A1 | 1/2008 | Holtzman et al. |
| 2008/0010452 A1 | 1/2008 | Holtzman et al. |
| 2008/0010455 A1 | 1/2008 | Holtzman et al. |
| 2008/0010458 A1 | 1/2008 | Holtzman et al. |
| 2008/0010685 A1 | 1/2008 | Holtzman et al. |
| 2008/0022395 A1 | 1/2008 | Holtzman et al. |
| 2008/0022413 A1 | 1/2008 | Holtzman et al. |
| 2008/0034440 A1 | 2/2008 | Holtzman et al. |
| 2008/0276309 A1 * | 11/2008 | Edelman ............... G06F 21/335 |
| | | 726/9 |
| 2010/0138652 A1 | 6/2010 | Sela et al. |
| 2010/0162377 A1 | 6/2010 | Gonzalez et al. |
| 2013/0283361 A1 * | 10/2013 | Rao ...................... G06F 21/31 |
| | | 726/7 |
| 2013/0339739 A1 | 12/2013 | Hueber et al. |
| 2014/0010371 A1 | 1/2014 | Khazan et al. |
| 2014/0013123 A1 | 1/2014 | Khazan et al. |
| 2014/0020101 A1 | 1/2014 | Hansen |
| 2014/0047549 A1 * | 2/2014 | Bostley, III ............ G06F 21/60 |
| | | 726/26 |
| 2014/0157391 A1 | 6/2014 | Choi et al. |
| 2014/0181893 A1 * | 6/2014 | Von Bokern ........ H04L 63/0838 |
| | | 726/1 |
| 2014/0281544 A1 * | 9/2014 | Paczkowski ........... G06Q 10/00 |
| | | 713/171 |
| 2014/0282935 A1 | 9/2014 | Lal et al. |
| 2015/0381592 A1 | 12/2015 | Khazan et al. |
| 2015/0381659 A1 | 12/2015 | Khazan et al. |

OTHER PUBLICATIONS

European Search Report dated Mar. 10, 2017 issued in counterpart application No. 16154990.2-1870, 5 pages.
European Search Report dated Apr. 15, 2016 issued in counterpart application No. 16154990.2-1870, 8 pages.
International Search Report dated Jun. 3, 2016 issued in counterpart application No. PCT/KR2016/001051, 15 pages.

* cited by examiner

ELECTRONIC DEVICE AND METHOD FOR PROCESSING SECURE INFORMATION

PRIORITY

This application claims priority under 35 U.S.C. § 119(a) to a Korean patent application filed on Feb. 13, 2015 in the Korean Intellectual Property Office and assigned Serial Number 10-2015-0022739, the entire content of which is incorporated herein by reference.

FIELD OF THE DISCLOSURE

The present disclosure relates to processing secure information.

DESCRIPTION OF THE RELATED ART

In general, electronic devices may perform various functions according to applications installed therein. For example, electronic devices may provide support for installing an application that receives a request for processing secure information, and may provide support in executing, according to a user input, a related secure application installed in the electronic device.

In a conventional secure information processing method, secure information is stored and managed in a normal zone (or non-secure zone). Therefore, conventional secure information processing methods are vulnerable to security breaches. Since, in conventional secure information processing methods, separate secure information is requested for each application, users are required manage a significant amount of secure information.

SUMMARY

The present disclosure has been made to address at least the above problems and/or disadvantages and to provide at least the advantages described below. Accordingly, an aspect of the present disclosure is to provide a secure information processing method for storing and managing secure information in a more stable storage and providing an improved secure function and an electronic device for supporting the same.

Accordingly, another aspect of the present disclosure is to provide a method and apparatus for operating more simple and stable secure information by operating a variety of secure information according to application mapping information (or a mapping map or a mapping list).

In accordance with an aspect of the present disclosure, an electronic device is provided. The electronic device includes a housing; a memory configured to be located in the housing; a user interface; and a processor configured to electrically connect with the memory and the user interface, wherein the memory comprises a first zone and a second zone, which has a higher level of security than a level of security of the first zone, wherein the memory stores instructions that when executed by the processor, instruct the processor to receive first information from outside of the electronic device, at least temporarily store the received first information in the first zone, and store second information extracted from the first information in the second zone.

In accordance with another aspect of the present disclosure, a method for operating an electronic device is provided. The method includes obtaining first information in a first zone of a memory; extracting second information based on the first information in the first zone of the memory; and storing the second information in a second zone of the memory that has a higher level security than a level of security of the first zone.

In accordance with another aspect of the present disclosure a non-transitory computer readable medium with computer executable instructions stored thereon executed by a processor to perform a method for operating an electronic device is provided. The method includes obtaining first information in a first zone of a memory; extracting second information based on the first information in the first zone of the memory; and storing the second information in a second zone of the memory that has a higher level security than a level of security of the first zone.

BRIEF DESCRIPTION OF THE DRAWINGS

The above and other aspects, features, and advantages of the present disclosure will be more apparent from the following description when taken in conjunction with the accompanying drawings, in which.

DETAILED DESCRIPTION

Figure 1:
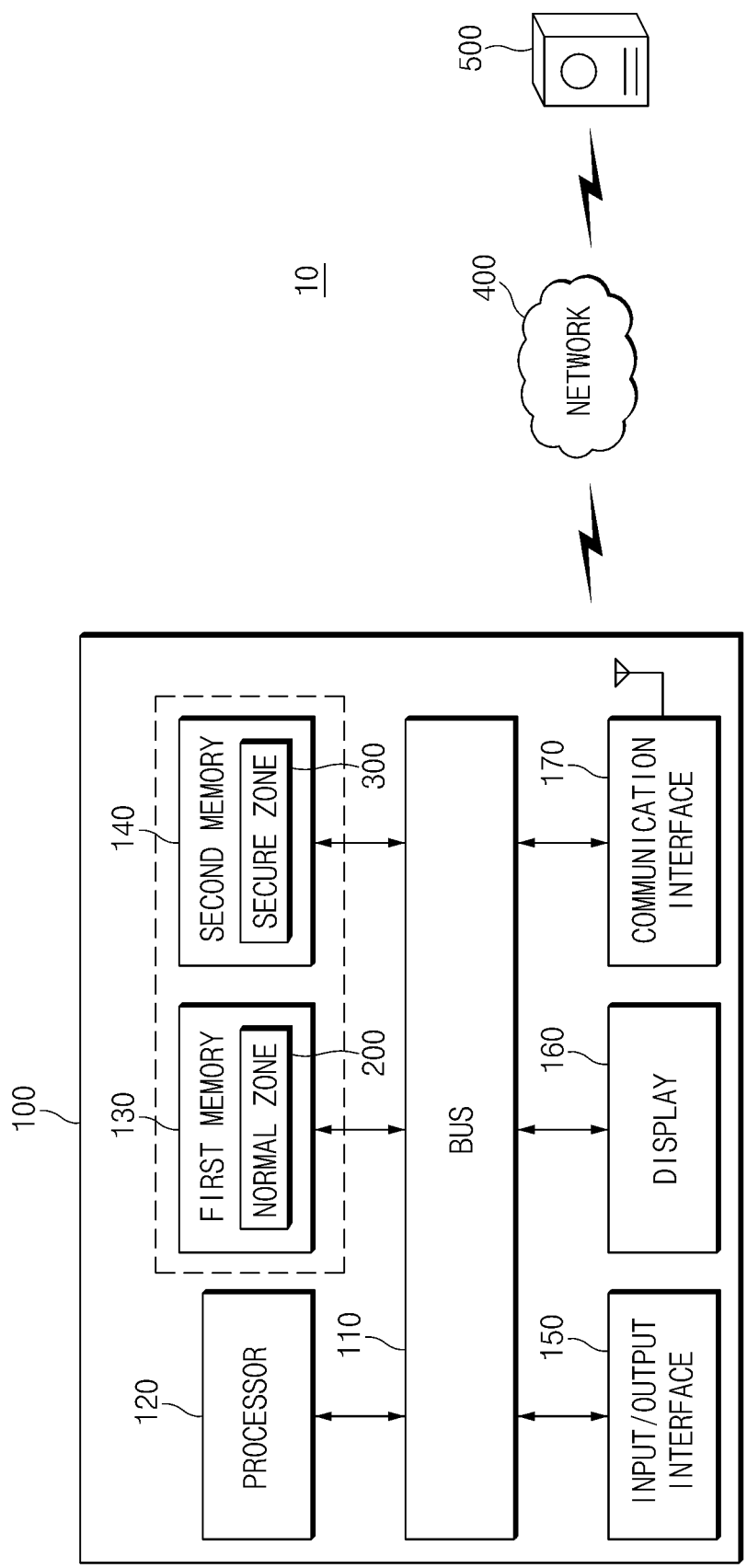
FIG. 1 is a block diagram illustrating a secure information processing environment according to an embodiment of the present disclosure.

Hereinafter, embodiments of the present disclosure are described with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

The expressions "have", "may have", "include" and "comprise", or "may include" and "may comprise", as used herein, indicate the existence of corresponding features (e.g., elements such as numeric values, functions, operations, or components), but do not exclude presence of additional features.

The expressions "A or B", "at least one of A or/and B", or "one or more of A or/and B", and the like, as used herein, may include any and all combinations of one or more of the associated listed items. For example, the terms "A or B", "at least one of A and B", or "at least one of A or B" may refer to situations in which (1) at least one A is included, (2) at least one B is included, or (3) both of at least one A and at least one B are included.

Expressions such as "1st", "2nd", "first", or "second", and the like, as used herein, may refer to various elements irrespective of the order and/or priority of the corresponding elements, but do not limit the corresponding elements. The expressions may be used to distinguish one element from another element. For instance, both a first user device and a second user device indicate different user devices from each other irrespective of the order or priority of the corresponding elements. For example, a first component may be referred to as a second component and vice versa without departing from the scope of the present disclosure.

Herein, when an element (e.g., a first element) is referred to as being "(operatively or communicatively) coupled with/to" or "connected to" another element (e.g., a second element), the element can be directly coupled with/to or connected to the other element, or an intervening element (e.g., a third element) may be present. By contrast, when an element (e.g., a first element) is referred to as being "directly coupled with/to" or "directly connected to" another element (e.g., a second element), there are no intervening elements (e.g., a third element) between the element and the other element.

The expression "configured to", as used herein, may be interchangeably used with, for example, the expression "suitable for", "having the capacity to", "designed to", "adapted to", "made to", or "capable of". The term "configured to" is not limited only to "specifically designed to" by a hardware configuration. Instead, under any situation, the expression "a device configured to" may indicate that the device is "capable of" operating together with another device or other components. For example, a "processor configured to perform A, B, and C" may refer to a generic-purpose processor (e.g., a central processing unit (CPU) or an application processor) that may perform corresponding operations by executing one or more software programs that store a dedicated processor (e.g., an embedded processor) for performing a corresponding operation.

Terms used herein are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same definition that is generally understood by a person skilled in the art. It will be further understood that terms that are defined in a dictionary and commonly used should also be interpreted as is customary in the relevant related art, and not in an idealized or overly formal detect, unless expressly so defined herein. In some cases, even terms that are defined herein may not be interpreted to exclude embodiments of the present disclosure.

Electronic devices, according to various embodiments of the present disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMI's), Motion Picture Experts Group (MPEG-1 or MPEG-2) Audio Layer-3 (MP3) players, mobile medical devices, cameras, or wearable devices (e.g., smart glasses, head-mounted-devices (HMDs), an electronic apparel, electronic bracelets, electronic necklaces, electronic appcessories, electronic tattoos, smart mirrors, or smart watches).

Herein, the electronic devices may be smart home appliances. The smart home appliances may include at least one of, for example, televisions (TVs), digital versatile disk (DVD) players, audios, refrigerators, air conditioners, cleaners, ovens, microwave ovens, washing machines, air cleaners, set-top boxes, home automation control panels, security control panels, TV boxes, game consoles, electronic dictionaries, electronic keys, camcorders, or electronic picture frames.

Further, the electronic devices may be embodied as at least one of various medical devices (e.g., various portable medical measurement devices (e.g., blood glucose meters, heart rate meters, blood pressure meters, or thermometers, and the like), a magnetic resonance angiography (MRA), a magnetic resonance imaging (MRI), a computed tomography (CT), scanners, or ultrasonic devices, and the like), navigation devices, global positioning system (GPS) receivers, event data recorders (EDRs), flight data recorders (FDRs), vehicle infotainment devices, electronic equipment for vessels (e.g., navigation systems for vessels, gyrocompasses, and the like), avionics, security devices, head units for vehicles, industrial or home robots, automatic teller's machines (ATMs), points of sales (POS) devices, or Internet of Things (e.g., light bulbs, various sensors, electric or gas meters, sprinkler devices, fire alarms, thermostats, street lamps, toasters, exercise equipment, hot water tanks, heaters, boilers, and the like).

Additionally, the electronic devices may be embodied as at least one of parts of furniture or buildings/structures, electronic boards, electronic signature receiving devices, projectors, or various measuring instruments (e.g., water meters, electricity meters, gas meters, or wave meters, and the like). The electronic devices may be embodied as one or more combinations of the above-mentioned devices. The electronic devices may be flexible electronic devices. Also, the electronic devices according to various embodiments of the present disclosure are not limited to the above-described devices, and may include new electronic devices according to developments in technology.

The term "user", as used herein, may refer to a person who uses an electronic device or may refer to a device (e.g., an artificial intelligence electronic device) which uses an electronic device.

FIG. 1 is a block diagram illustrating a secure information processing environment according to an embodiment of the present disclosure.

Referring to FIG. 1, a secure information processing environment 10 includes an electronic device 100, a network 400, and a server 500.

In the secure information processing environment 10, the electronic device 100 may extract seed information (e.g., second information) from token information (or ticket information) (e.g., first information) received from the server 500. The electronic device 100 may store the extracted seed information in a secure zone. The secure zone may be a part of a memory. The secure zone may be able to access by way of secure processing. The electronic device 100 may generate secure operation information (e.g., third information), associated with an application operated in a normal zone (e.g., a first zone of a memory) or operated in the secure zone (e.g., a second zone of the memory), using the seed information stored in the secure zone. The electronic device 100 may process a function of a predetermined application according to the generated secure operation information. An example in which the secure information processing environment 10 is an environment of provides support in processing secure information associated with a one time password (OTP) is described as follows.

The token information may include information necessary for an OTP application operation of the electronic device 100 in the server 500 (e.g., an OTP application authentication server). The token information may have, for example, a form in which elements are extracted by being parsed by the electronic device 100 (e.g., a package form, that is, at least one of an xml document form, a data packet form, or a database form). The token information may include token related information (e.g., fourth information), such as a user identification (ID), an electronic device ID, application related information, and seed information (e.g., a seed key) used to generate an OTP. For example, the token information may include token related information (e.g., a user ID, application type information, information associated with a token generation time, and the like) and seed information. The token information may include seed information and may include different information according to a token format or a design method of a designer, or policy of the token.

The seed information may be encrypted and included in token information. The seed information may be transmitted to an OTP application of the electronic device 100 to be used to generate an OTP. The seed information may be stored in a zone that provides secure function of the electronic device 100. According to an embodiment of the present disclosure, the seed information may be decrypted in a software zone (e.g., an OTP secure application of the secure zone 300) which provides secure performance and may be stored in a hardware zone (e.g., a secure file system of the secure zone 300) that provides secure performance. The seed information may include seed key information associated with generating an OTP. According to an embodiment of the present disclosure, the secure information processing environment 10 may include an environment of providing support in processing secure information in a public key structure. In this case, the seed information may include private key information associated with a public key signature.

The security operating information may be information generated according to operation of a predetermined algorithm according to the seed information. For example, the secure operating information may include an OTP or OTP related information. Alternatively, the secure operating information may include predetermined information requested by the server 500.

The network 400 may provide support in establishing a communication channel between the electronic device 100 and the server 500. The network 400 may include at least one of an internet network, a wireless-fidelity (Wi-Fi) network, and a mobile communication network based on base stations. The network 400 may transmit a token information request message from the electronic device 100 to the server 500. The token information request message may include at least one of, for example, identification information of the electronic device 100 (e.g., type information of the electronic device 100, connection information of the electronic device 100, unique address information of the electronic device 100, and the like), user information (e.g., a user name, predetermined number information provided to a user, and the like), or application related information (e.g., application type information, application installation time information, and the like).

The network 400 may transmit token information generated by the server 500 to the electronic device 100. The network 400 may provide secure operation information, which is generated according to seed information in a secure zone by the electronic device 100, to the server 500 in connection with OTP authentication of the electronic device 100.

The server 500 may establish a communication channel with the electronic device 100 through the network 400. The server 500 may include an information providing server that generates token information in response to a request of the electronic device 100 and provides the generated token information to the electronic device 100. The server 500 may also include an information operation server that sends a request to the electronic device 100 for token operating information, and receives and processes the token operation information from the electronic device 100. The information providing server, which provides the above-mentioned token information, and the information operation server, which processes the token operating information, may be configured independently of each other. Alternatively, the information providing server and the information operation server may be the same server.

According to an embodiment of the present disclosure, the server 500 may grant a predetermined user access and may deny OTP authentication of a predetermined electronic device in response to a user request. For example, if a user or an administrator of the server 500 requests a setting for which OTP authentication of a specific electronic device is impossible in response to loss of the electronic device, the server 500 may disregard an OTP authentication request of the corresponding electronic device. In this regard, the user who loses the electronic device may access a webpage provided from the server 500 or may provide notification of a loss state of the electronic device using various communication connection methods.

The electronic device 100 may include a housing and may receive token information using an application operated according to a normal zone 200 stored in a first memory 130 disposed in a predetermined position of the housing. The electronic device 100 may extract seed information using a framework of the normal zone 200. The electronic device 100 may store seed information of token information in the secure zone 300 using a secure application operated according to the secure zone 300 stored in a second memory 140.

The electronic device 100 includes a display 160, a user interface (i.e., the input and output interface 150), a memory that includes the first memory 130 and the second memory 140), and a processor 120. The processor 120 may receive seed information using a protected method and may store the seed information in a part of the memory that is accessible in a trusted execution environment (TEE). The processor 120 may generate an OTP according to at least a part of the seed information in the TEE according to a request in a rich execution environment (REE). The processor 120 may control to display the OPT on the display.

The display 160 may be a part of a user interface (i.e., the input and output interface 150) and may output a screen associated with operating an OTP. The memory may store at least one of token information, seed information, token related information, or token operation information. Herein, the seed information, the token related information, and the token operation information may be stored in a zone that has a relatively high level of security among memory zones of the memory. The processor 120 may electrically connect to the display 160 and the memory and may separately operate according to the REE and the TEE. The seed information may be provided from the server 500 or another similar device. The seed information may be provided with predetermined token information. In connection with providing token information, a server and a wireless communication terminal may establish a secure communication channel (e.g., a channel for performing encryption using a predetermined algorithm when data are communicated).

The electronic device 100 may generate secure operation information according to the seed information in the secure zone 300, in response to a request for generating the secure operation information in the normal zone 200. The electronic device 100 may transmit the generated secure operation information to the normal zone 200 and may process the secure operation information according to an application operated in the normal zone 200. The electronic device may provide secure operation information via the display 160, the input and output interface 150, a communication interface 170, and the like. The input and output interface 150 may provide support in outputting the generated secure operation information (e.g., outputting the generated secure operation information on the display) or may support in transmitting the generated secure operation information (e.g., transmitting the generated secure operation information to the server 500 through the communication interface). This input and output interface 150 may electrically connect to the processor 120 of the electronic device 100 and may process secure operation information under control of the processor 120.

In this regard, the electronic device 100 includes a bus 110, the processor 120, the first memory 130, the second memory 140, the input and output interface 150, the display 160, and the communication interface 170. Meanwhile, according to an embodiment of the present disclosure, the first memory 130 and the second memory 140 may be physically configured within a single memory, or may be configured independently of each other according to a design of the memories.

The bus 110 may be, for example, a circuit that connects components 120 to 170 with each other, and transmits communication (e.g., a control message and/or data) between the components. The bus 110 may receive a predetermined function access request through the input and output interface 150. The bus 110 may transmit a token information request of an application operated in the normal zone 200 to the communication interface 170. The bus 110 may transmit token information received in the communication interface 170 to the normal zone 200 in response to control of the processor 120. The bus 110 may transmit seed information of the token information to the secure zone 300 in response to control of the processor 120. The bus 110 may transmit secure operation information generated in the secure zone 300 to the normal zone 200 or the communication interface 170.

The processor 120 may include one or more of a central processing unit (CPU), an application processor (AP), or a communication processor (CP). For example, the processor 120 may perform calculation or data processing about control and/or communication of at least another of the components of the electronic device 100. The processor 120 may assign at least one process (or task or thread) that provides support in operating the normal zone 200 included in the first memory 130. The processor 120 may also assign at least one process (or task or thread) that provides support in operating the secure zone 300 included in the second memory 140. The processor 120 may be designed and operated with hardware into which the normal zone 200 is loaded and hardware into which the secure zone 300 is loaded. The processor 120 may include a processor associated with the normal zone 200 and a processor associated with the secure zone 300.

Each of the first memory 130 and the second memory 140 may include a volatile and/or non-volatile memory. Each of the first memory 130 and the second memory 140 may store, for example, instructions or data associated with at least another of the components of the electronic device 100. The first memory 130 may store a program associated with the normal zone 200. The second memory 140 may store a program associated with the secure zone 300.

As noted herein above, the first memory 130 and the second memory 140 may be integrated as a single memory. In this case, the normal zone 200 and the secure zone 300 may be logically divided and disposed in a single memory. The normal zone 200 and the secure zone 300, which are stored in one memory, may be loaded into zones (e.g., a normal process zone and a secure process zone) divided in a process of being loaded into the processor 120.

The memory 130 may software and/or a program. The program may include a kernel, a middleware, an application interface (e.g., an application programming interface), and an application. At least a part of the kernel, the middleware, or the application interface may be referred to as an operating system (OS).

The kernel may control or manage, for example, system resources (e.g., the bus 110, the processor 120, or the first memory 130, and the like) used to execute an operation or function implemented in the other programs (e.g., the middleware, the application interface, or the application). The kernel may provide an interface that may control or manage system resources by accessing a separate component of the electronic device 100 in the middleware, the application interface, or the application.

The middleware may operate as, for example, a go-between such that the application interface or the application communicates with the kernel and transmits and receives data. The middleware may perform control (e.g., scheduling or load balancing) for work requests using a method of assigning priority, which may use system resources (e.g., the bus 110, the processor 120, or the first memory 130, and the like) of the electronic device 100, to at least one application among the applications, in connection with the work requests received from the application.

For example, the application interface (e.g., an application protocol interface (API)) may be, for example, an interface in which the application controls a function provided from the kernel or the middleware. For example, the application interface may include at least one interface or function (e.g., instruction) for file control, window control, image processing, or text control, and the like.

The application may be a program associated with at least one function provided to a user through operation of the electronic device 100. The application may include a banking application, a stock application, an e-mail application, a data management application, a cloud application, and the like. The application calls an application for processing secure operation information while being executed. Alternatively, the application may include at least one program routine associated with processing secure operation information.

The second memory 140 may store secure software and/or a secure program. The secure program may include a secure kernel, a secure function middleware, a secure function application interface (e.g., an application programming interface), and a secure function application. At least a part of the secure kernel, the secure function middleware, or the secure function application interface may be referred to as a secure operating system (OS) (e.g., a trust zone OS (TZOS)). At least a part of the secure kernel, the secure function middleware, or the secure function application interface may be operated to support an execution environment having a secure level in a state where control right for at least one of the bus 110, the second memory 140, the input and output interface 150, the display 160, or the communication interface 170 is obtained.

The electronic device 100 may operate an execution environment having a plurality of security levels to strengthen security. The execution environment having the secure levels may include, for example, a trusted execution environment (TEE) that has a relatively higher security level than a security level of a rich execution environment (REE). The electronic device may operate the TEE through a hardware physical change or a software logical change.

The TEE may store data that receives a request for a relatively high secure level and may perform a related operation in a safe environment. The TEE may operate on an application processor (AP) included in the processor 120 of the electronic device and may operate according to a reliable hardware structure determined in a manufacturing process of the electronic device. The TEE may classify an AP and a memory into the normal zone of the first memory 130 and the secure zone of the second memory 140 and may operate in the secure zone. The TEE may set software or hardware necessary for security to operate in only the secure zone. The electronic device may operate the TEE through a hardware physical change or a software logical change.

The TEE may be implemented using a trust zone (TZ) according to an Acorn reduced instruction set computing (RISC) machine (ARM) architecture. The TZ may divide a processor (e.g., the processor 120) into two virtual cores. The REE may be executed in the one virtual core, and the TEE may be executed in the other virtual core. The TEE may be implemented using a separate processor. Alternatively, the TEE may be implemented with an on-chip type.

The secure function application may include, for example, a secure operation information application associated with at least one of a banking application, a stock application, an e-mail application, a data management application, and a cloud application.

The input and output interface 150 may operate as, for example, an interface that may transmit instructions or data input from a user or another external device to another component (or other components) of the electronic device 100. The input and output interface 150 may also output instructions or data received from another component (or other components) of the electronic device 100 to the user or the other external device. The input and output interface 150 may include, for example, at least one of a physical button, a touch button, a touch pad, or a touch screen, and the like. The input and output interface 150 may also include an input means by an electronic pen and the like. The input and output interface 150 may also include an audio collecting device (e.g., a microphone) that may collect an audio signal.

The input and output interface 150 may generate an input signal according to a user input in an environment of operating the normal zone 200 or the secure zone 300. For example, the input and output interface 150 may transmit an input signal obtained in the environment of operating the normal zone 200 to the normal zone 200. The input and output interface 150 may transmit an input signal obtained in the environment of operating the secure zone 300 to the secure zone 300.

The input and output interface 150 may include at least one output device which may output guide information associated with processing secure information. For example, the input and output interface 150 may include an audio output device, a lamp, a vibration output device, and the like. The input and output interface 150 may output at least one of predetermined audio data, a predetermined ON/OFF pattern, or a predetermined vibration pattern corresponding to at least one of the reception of token information, the storing of seed information, the generation of secure operation information, or the processing of secure operation information. At least one of the audio data, the ON/OFF pattern, or the vibration pattern may be omitted according to settings or according to the presence or lack of support by the electronic device 100.

The display 160 may include, for example, a liquid crystal display (LCD), a light emitting diode (LED) display, an organic LED (OLED) display, a microelectromechanical systems (MEMS) display, or an electronic paper display. The display 160 may display, for example, various contents (e.g., text, images, videos, icons, or symbols, and the like) to the user. The display 160 may include a touch screen, and may receive, for example, touch, gesture, proximity, or a hovering input using an electronic pen or a part of a body of the user.

The display 160 may output at least one screen associated with processing secure information. For example, the display 160 may output a screen corresponding to a request sent to the server 500 for token information, and a screen of guiding or indicating that seed information of token information that is stored and completed in the secure zone 400. The display 160 may output at least one of an application execution screen associated with secure operation information, a secure operation information generating screen, or a secure operation information processing screen.

The communication interface 170 may establish communication between, for example, the electronic device 100 and an external device. For example, the communication interface 170 may connect to a network through wireless communication or wired communication and may communicate with the external device. The wireless communication may use, for example, at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), and the like as a cellular communication protocol. The wired communication may include at least one of, for example, universal serial bus (USB) communication, high definition multimedia interface (HDMI) communication, recommended standard 232 (RS-232) communication, or plain old telephone service (POTS) communication, and the like. The network may include a telecommunications network, for example, at least one of a computer network (e.g., a local area network (LAN) or a wide area network (WAN)), the Internet, or a telephone network.

The communication interface 170 may establish, for example, a communication channel with the server 500 through the network 400. The communication interface 170 may receive token information in response to a control operation of the processor 120. Also, the communication interface 170 may transmit secure operation information to the server 500 in response to operating a predetermined application.

Figure 2:
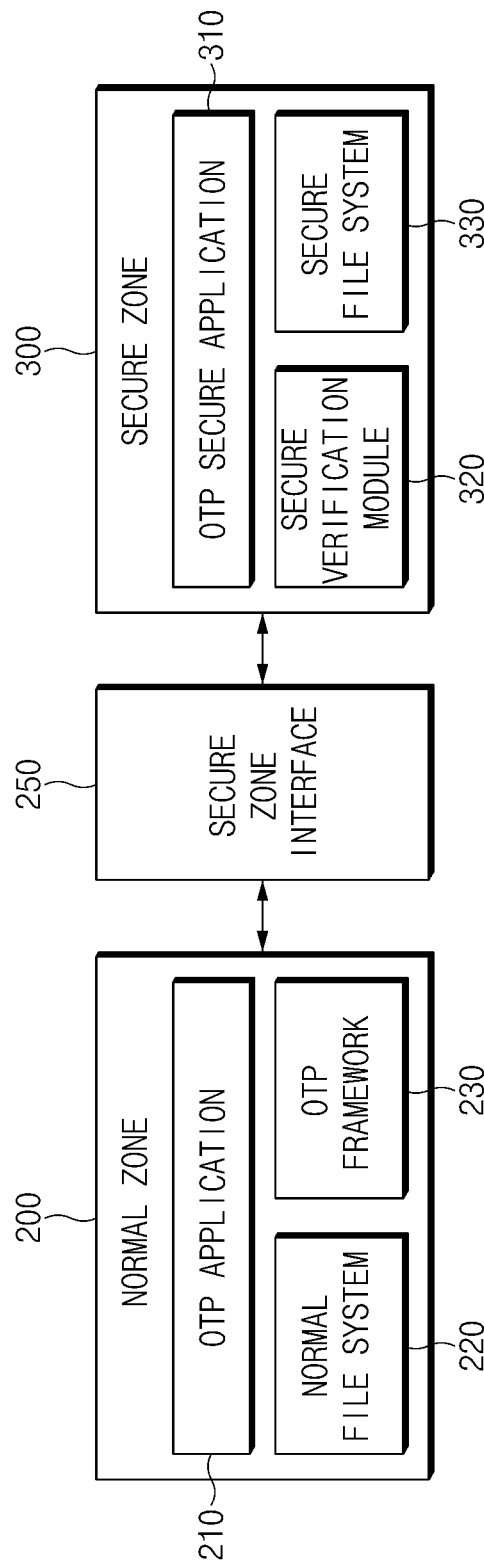
FIG. 2 is a block diagram illustrating a configuration of a program module according to an embodiment of the present disclosure.

FIG. 2 is a block diagram illustrating a configuration of a program module according to an embodiment of the present disclosure.

Referring to FIG. 2, a program module according to an embodiment of the present disclosure includes a normal zone 200, a secure zone interface 250, and a secure zone 300.

The normal zone 200 may include programs that process normal functions of an electronic device 100 of FIG. 1. For example, the normal zone 200 may include an OTP application 210, an OTP framework 230, and a normal file system 220. The OTP application 210 may include an application of a service provider that serves an OTP or applications necessary for authentication using an OTP. This OTP application 210 may access the OTP framework 230 in connection with operating an OTP. For example, the OTP application 210 may play a role in supporting an environment for generating an OTP.

The OTP application 210 may transmit a request for token information associated with supporting an OTP function. For example, the OTP application 210 may be executed according to an icon selection or a menu selection, or may be activated when executing a related function. The OTP application 210 may request a server 500 of FIG. 1, which provides token information according to a user input or a scheduled task, to transmit token information. In this operation, the OTP application 210 may transmit identification information of the electronic device 100, an application type, user input information, or stored specific information to the server 500. If token information is received, the OTP application 210 may transmit the received token information to the OTP framework 230.

Also, the OTP application 210 may include an application associated with performing a specific function necessary for an OTP function. The OTP application 210 may support a normal connection with the server 500 in a function necessary for an OTP function. For example, the OTP application 210 may request the OTP framework 230 to transmit OTP information. If the OTP information is received from the OTP framework 230, the OTP application 210 may transmit the received OTP information to the predetermined server 500.

The OTP framework 230 may provide an environment for operating an OTP. For example, the OTP framework 230 may include a kernel, a middleware, an API, and the like, which are necessary for executing the OTP application 210. The OTP framework 230 may proceed with a process necessary for receiving token information from the server 500, according to a request of the executed OTP application 210 by a processor 120 of FIG. 1. Also, the OTP framework 230 may extract seed information from received token information and may transmit the extracted seed information to the secure zone 300. In this operation, the OTP framework 230 may store the token information except for the seed information, for example, token related information in the normal file system 200.

The OTP framework 230 may provide support in automatically operating an OTP in a process of communicating with the server 500, which has a predetermined identifier. Also, the OTP framework 230 may control synchronization, deletion, and the like of seed information stored in the secure zone 300. Also, the OTP framework 230 may interface with the secure zone 300, associated with operating an OTP generated according to seed information, through the secure zone interface 250.

The secure zone interface 250 may provide support in interfacing data between the normal zone 200 and the secure zone 300. In this regard, the secure zone interface 250 may include a process which reserves the right to access the secure zone 300. For example, the secure zone interface 250 may operate the process, which reserves the right to access the secure zone 300, according to a request of the normal zone 200 and may transmit seed information to the secure zone 300 according to the corresponding process. The secure zone interface 250 may transmit OTP information generated in the secure zone 300 to the normal zone 200 according to a request of the normal zone 200.

The secure zone 300 may be a zone in which applications asked for a secure function of the electronic device 100 are installed and operated. The secure zone 300 may not grant an invalid access, may verify a valid user or process (e.g., the secure zone interface 250), and may disable an illegal access. The secure zone 300 may generate an OTP and may transmit the generated OTP to the normal zone 200. In this regard, the secure zone 300 may include an OTP secure application 210, a secure verification module 320, and a secure file system 330. In addition, the secure zone 300 may include an OTP trust service module in connection with operating an OTP. The OTP trust service module may provide a path (or a channel) associated with an OPT that may access a TZ.

The OTP secure application 310 may be an OTP related application driven in the secure zone 300. The OTP secure application 310 may decrypt, for example, transmitted seed information. The OTP secure application 310 may operate seed information decryption algorithms. The seed information decryption algorithms may include cryptographic algorithms. Also, the seed information decryption algorithms may be, for example, symmetric encryption algorithms of various modes including advanced encryption standard (AES) algorithms. The AES algorithms may be cipher block chaining (CBC) mode algorithms (e.g., AES-128-CBC keys, AES-256-CBC keys, and the like). The seed information decryption algorithms may be, for example, password based encryption (PBE) algorithms. The OTP secure application 310 may store decrypted seed information in the secure file system 330. The OTP secure application 310 may store seed information, in which a decryption process is not performed, in the secure file system 330 or may encrypt and store decrypted seed information in the secure file system 330 using an algorithm supported in the secure zone 300.

The OTP secure application 310 may generate an OTP using the seed information stored in the secure file system 330. In this regard, the OTP secure application 310 may operate OTP generation algorithms. The OTP generation algorithms may include cryptographic algorithms. The OTP generation algorithms may include, for example, a hash message authentication code (HMAC)-based one-time password algorithm (HOTP), a time based one time password algorithm (TOTP), an OATH challenge response algorithm (OCRA), and the like. The OTP generation algorithms may be stored in the secure file system 330 and may be provided in connection with operating the OTP secure application 310.

The secure verification module 320 may inspect a secure state (i.e., reliability) of the electronic device 100. The secure verification module 320 may verify whether reliability of the normal zone 200 is in a damaged or ruined state (e.g., a currently hacked state) or whether reliability of the secure zone 300 is in a damaged or ruined state (e.g., a currently hacked state). If the reliability of the secure zone 300 (or at least one of the secure zone 300 or the normal zone 200) is in the damaged or ruined state, the secure verification module 320 may control the electronic device 100 not to store seed information in the secure zone 300. Also, if the reliability of the secure zone 300 (or at least one of the secure zone 300 or the normal zone 200) is in the damaged or ruined state, the secure verification module 320 may deny an OTP generation request of the normal zone 200. In addition, the secure verification module 320 may control to the electronic device 100 output a message, providing information about a state in which reliability of the electronic device 100 is damaged or ruined, through at least one of the input and output interface 150 or the display 160.

The secure file system 330 may be a zone disposed in the secure zone 300 and may support read and write of data according to an access by an operating system (OS) of the secure zone 300 or an access by the OTP secure application 310. The secure file system 330 may store, for example, encrypted seed information or decrypted seed information. The seed information stored in the secure file system 330 may be provided in a process of generating an OTP.

Figure 3A:
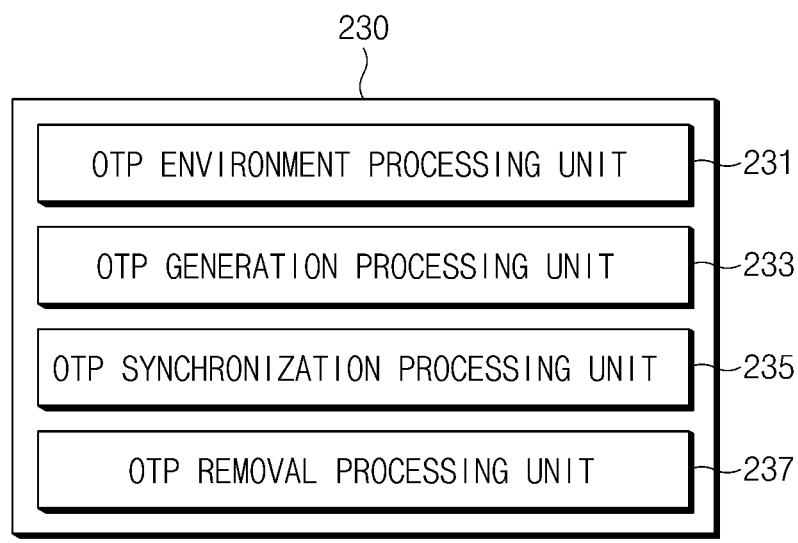
FIG. 3A is a block diagram illustrating a detailed configuration of a one time password (OTP) framework according to an embodiment of the present disclosure.

FIG. 3A is a block diagram illustrating a detailed configuration of an OTP framework according to an embodiment of the present disclosure.

Referring to FIG. 3A, an OTP framework 230 according to an embodiment of the present disclosure includes an OTP environment processing unit 231, an OTP generation processing unit 233, an OTP synchronization processing unit 235, and an OTP removal processing unit 237.

The OTP environment processing unit 231 may form an environment associated with operating an OTP. For example, the OTP environment processing unit 231 may support a portable symmetric key container (PSKC) scheme (request for comments (RFC) 6030) and a dynamic symmetric key provisioning protocol (DSKPP) scheme (RFC 6063) that open authentication (OATH)-based protocols which are established as standard in OATH compliance. Additionally or alternatively, the OTP environment processing unit 231 may support a previously defined direct data scheme that includes information necessary for operating an OTP. According to an embodiment of the present disclosure, a format of token information used in connection with operating an OTP, or a type of information included in the token information, may be changed according to the respective OPT operating schemes (e.g., the PSKC scheme, the DSKPP scheme, or the direct data scheme).

The OTP environment processing unit 231 may receive token information from an OTP application 210 of FIG. 2 and may extract or parse information from the received token information. The OTP environment processing unit 231 may transmit predetermined information of the extracted information, for example, seed information to an OTP secure application 310 of a secure zone 300 of FIG. 2 through a secure zone interface 250 of FIG. 2. The OTP environment processing unit 231 may store token related information 221 of FIG. 4, in which seed information is excluded from the token information, in a normal file system 220 described later herein with reference to FIG. 4.

If an OTP generation request of the OTP application 210 is received, the OTP generation processing unit 233 may transmit the received OTP generation request to the OTP secure application 310 of the secure zone 300 through the secure zone interface 250. For example, the OTP generation processing unit 233 may generate an OTP generation request message including type information of an application associated with generating an OTP, index information of related seed information, and the like. The OTP generation processing unit 233 may transmit the OTP generation request message to the OTP secure application 310. In transmitting the OTP generation request message, the OTP generation processing unit 233 may verify validity of the OTP generation request message or may verify whether the OTP application 210 is normal (i.e., may verify validity of a package or a signature). If the OTP application 210 is normal, the OTP generation processing unit 233 may transmit the OTP generation request message to the OTP secure application 310. If an OTP generated in response to an OTP generation request is received from the OTP secure application 310, the OTP generation processing unit 233 may transmit the received OTP to the OTP application 210.

If an electronic device 100 of FIG. 1 and a server 500 of FIG. 1 are incorrectly synchronized, the OTP synchronization processing unit 235 may process the incorrect synchronization. For example, if an OTP generation request is generated, the OTP synchronization processing unit 235 may request the OTP secure application 310 to perform processing associated with OTP synchronization. The OTP synchronization processing unit 235 may determine a need for synchronization and if it is determined that there is a need for synchronization, the OTP synchronization processing unit 235 may transmit a synchronization instruction to the OTP secure application 310, or reset real data to an updated value, and may transmit the updated value to the OTP secure application 310.

If it is determined that there is no need for seed information stored in the secure zone 300, the OTP removal processing unit 237 may transmit a corresponding seed information removal request to the OTP secure application 310. For example, the OTP removal processing unit 237 may receive a deletion instruction of seed information from the OTP application 210. In this case, after validity of the corresponding deletion instruction is checked, if the corresponding deletion instruction is valid, the OTP removal processing unit 237 may transmit the deletion instruction to the OTP secure application 310.

Figure 3B:
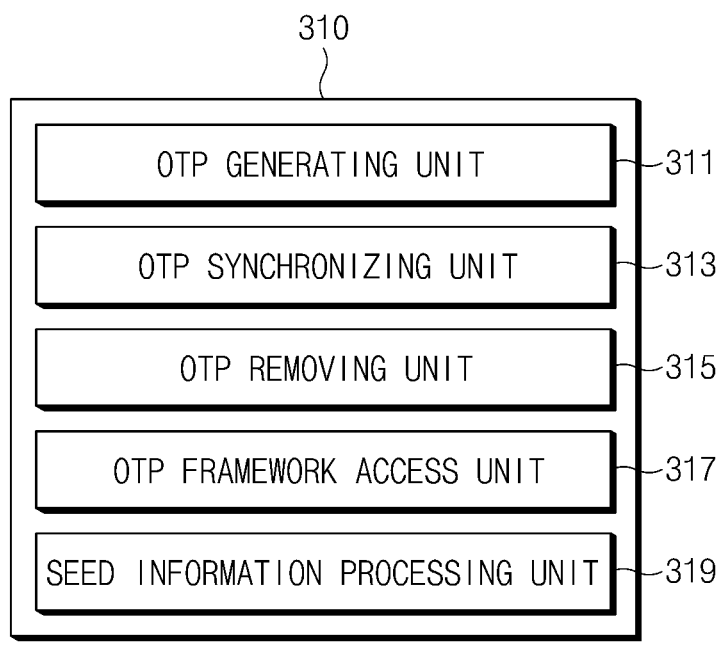
FIG. 3B is a block diagram illustrating a detailed configuration of an OTP secure application according to an embodiment of the present disclosure.

FIG. 3B is a block diagram illustrating a detailed configuration of an OTP secure application according to an embodiment of the present disclosure.

Referring to FIG. 3B, an OTP secure application 310 may include an OTP generating unit 311, an OTP synchronizing unit 313, an OTP removing unit 315, an OTP framework access unit 317, and a seed information processing unit 319.

If a request for generating an OTP from a normal zone 200 of FIG. 2 is received by the electronic device 100, the OTP generating unit 311 may generate the OTP according to seed information stored in a secure file system 330 of FIG. 2. In generating the OTP, if the seed information is encrypted, the OTP generating unit 311 may decrypt the encrypted seed information and may generate the OTP. If decrypted seed information is stored the secure file system 330, the OTP generating unit 311 may generate an OTP using the seed information and a predetermined OTP generation algorithm. The OTP generating unit 311 may transmit the generated OTP to the OTP framework access unit 317. Additionally or alternatively, in the operation of generating the OTP, the OTP generating unit 311 may use user input pin information and seed information.

The OTP synchronizing unit 313 may synchronize OTP time information. For example, the OTP synchronizing unit 313 may verify synchronization of OTP information at the time of receiving an instruction associated with synchronization from an OTP synchronization processing unit 235 of FIG. 3A (e.g., a predetermined time, a constant period, or the time that an OTP generation request according to seed information is generated). For example, the OTP generating unit 313 may collect synchronous time information of the generated OTP and OTP synchronous time information received from a server 500 of FIG. 1. The OTP synchronizing unit 313 may verify synchronization according to comparison of the collected synchronous time information. If synchronization is incorrect, the OTP generating unit 313 may operate an API for synchronization and process synchronization.

In connection with processing the synchronization, the OTP synchronizing unit 313 may perform another processing for the synchronization in response to a type of an operated OTP algorithm. For example, while OTP processing of the TOTP and the OCRA is performed, the OTP synchronizing unit 313 may synchronize a generated synchronous value. While OTP processing of the HOTP and the OCRA is operated, the OTP synchronizing unit 313 may adjust an event count value. The OTP synchronizing unit 313 may update a policy on OTP synchronization of the electronic device 100 according to data received from the server 500.

As an OTP removing instruction of an OTP removal processing unit 237 of FIG. 3A is received, the OTP removing unit 315 may remove an OTP. Alternatively, if validity of a generated OTP is lost (e.g., if a predetermined time elapses, and the like), the OTP removing unit 315 may remove the corresponding OTP. The OTP removing unit 315 may transmit an alarm corresponding to the removal of the OTP, after the OTP is removed, to the OTP removal processing unit 237.

The OTP framework access unit 317 may establish a channel with an OTP framework 230 of FIG. 2 through a secure zone interface 250 of FIG. 2. The OTP framework access unit 317 may process reception of seed information transmitted from the OTP framework 230, reception of an OTP generation request, reception of an OTP removal request, and the like. The OTP framework access unit 317 may also transmit a generated OTP to the OTP framework 230.

The seed information processing unit 319 may store seed information received in the OTP framework access unit 317 in the secure file system 330. For example, if seed information is encrypted, the seed information processing unit 319 may decrypt the encrypted seed information and may store the decrypted seed information in the secure file system 330.

Alternatively, the seed information processing unit 319 may store seed information, which is in an encrypted state, in the secure file system 330. The seed information processing unit 319 may verify validity of seed information. If the validity of the seed information is lost (e.g., if a predetermined time elapses or if a predetermined number of times elapses), the seed information processing unit 319 may deletes seed information.

Figure 3C:
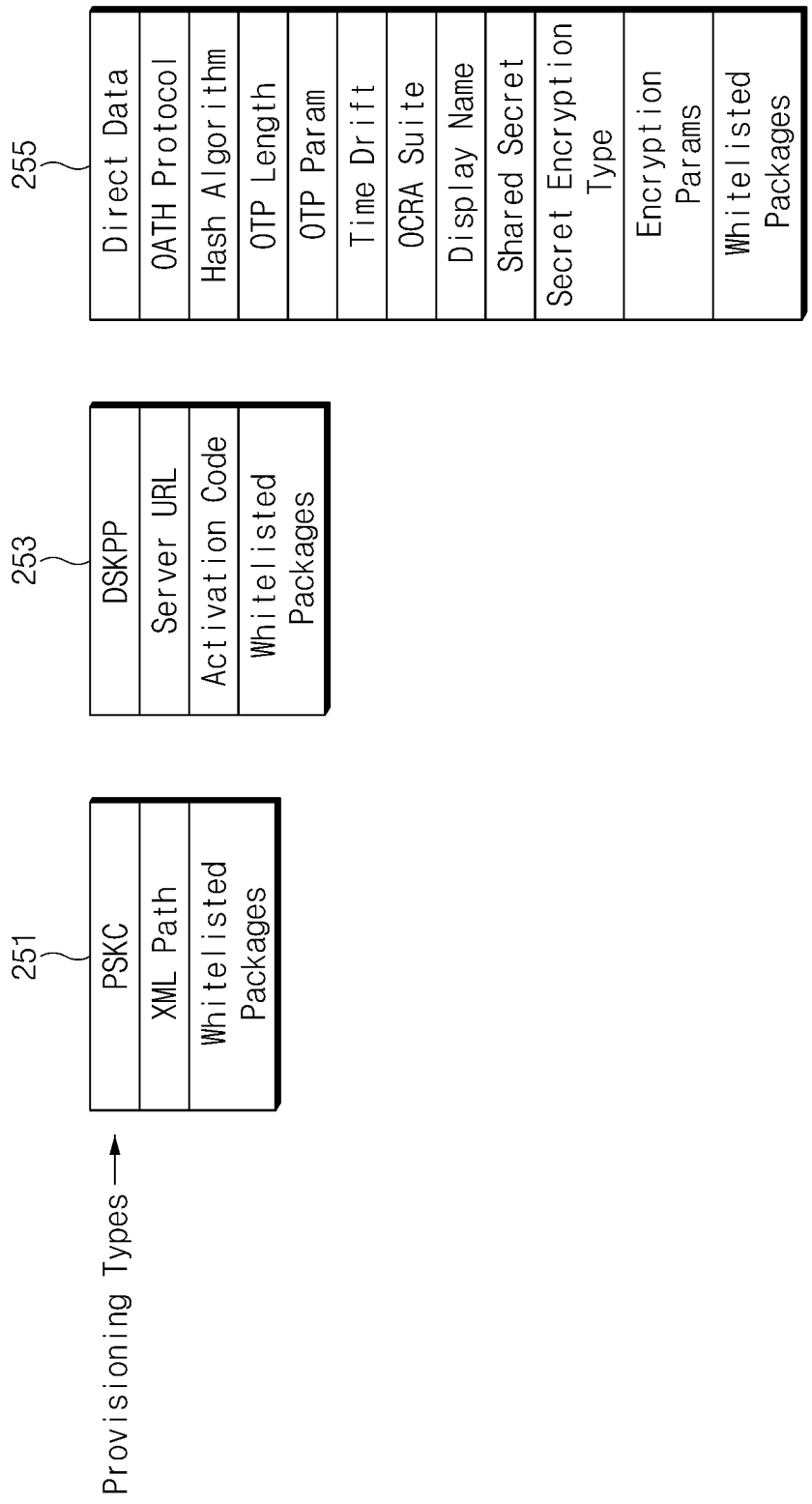
FIG. 3C is a diagram illustrating a protocol for supporting an OTP environment according to an embodiment of the present disclosure.

FIG. 3C is a diagram illustrating a protocol for supporting an OTP environment according to an embodiment of the present disclosure.

Referring to FIG. 3C, according to an embodiment of the present disclosure, an electronic device 100 of FIG. 1 may support at least one of a PSKC scheme 251, a DSKPP scheme 253, or a direct data scheme 255, which are associated with operating an OTP. According to an embodiment of the present disclosure, a format of token information used in connection with operating an OTP or a type of information included in token information may be different according to the respective supporting schemes (e.g., the PSKC scheme 251, the DSKPP scheme 253, or the direct data scheme 255). The PSKC scheme 251 may include, for example, extensible markup language (XML) path information, whitelisted packages information, and the like. The DSKPP scheme 253 may include, for example, server uniform resource locator (URL) information, activation code information, whitelisted packages information, and the like. The direct data scheme 255 may include, for example, at least one of OATH protocol information, hash algorithm information, OTP length information, OTP encoding information, OTP parameter (param) information, time drift information, OCRA suite information, display name information, shared secret information, secret encryption type information, encryption params information, or whitelisted packages information. According to an embodiment of the present disclosure, for service providers who do not follow the PSCK scheme 251 and the DSKPP scheme 253, the direct data scheme 255 may be a scheme of configuring token information including the above-mentioned various information.

The OATH protocol information may define a protocol used when an OTP is generated. For example, the OATH protocol information may include definition information about at least one of an HOTP, a TOTP, or an OCRA. The hash algorithm information may define a hash algorithm to be used in each protocol when an OTP is generated. For example, the hash algorithm information may include information such as HMAC secure hash algorithm (HMAC_SHA)1, HMAC_SHA256, and HMAC_SHA512. The hash algorithm may be used in only the HOTP and the TOTP. In case of the OCRA, an OTP may be generated using an algorithm defined in an OCRA suite. Therefore, in case of using the OCRA, although the hash algorithm information is set, it may be disregarded.

The OTP length information may define whether to generate an OTP of a few digits. For example, OTP_LENGTH:6 may refer to generating a six-digit OTP. The OTP encoding information may define an encoding type of a generated OTP. The OTP param information may define an initial counter (event value) of an HOTP or an OTP generation period of a TOTP.

The time drift information may be mainly used in case of the TOTP and may define an offset value for maintaining some degree of synchronization although a time of a server 500 of FIG. 1 is different from a time of an electronic device 100 of FIG. 1. The OCRA suite information may define an algorithm used when an OTP is generated in an OCRA. For example, the OCRA suite information may be at least one of OCRA-1:HOTP-SHA1-6:C-QA (Quality Assurance)06, OCRA-1:HOTP-SHA1-6:C-QN06, OCRA-1:HOTP-SHA1-8:C-QN08, OCRA-1:HOTP-SHA1-8:C-QA08, OCRA-1:HOTP-SHA256-8:C-QA08, OCRA-1:HOTP-SHA256-8:C-QN08, OCRA-1:HOTP-SHA1-6:C-QN06, OCRA-1:HOTP-SHA1-6:C-QN08, OCRA-1:HOTP-SHA1-8:C-QN06, OCRA-1:HOTP-SHA1-8:C-QA08, OCRA-1:HOTP-SHA1-6:QH40, OCRA-1:HOTP-SHA1-8:QH40, OCRA-1:HOTP-SHA1-6:QA06, OCRA-1:HOTP-SHA1-8:QN08, OCRA-1:HOTP-SHA256-8:QA08, OCRA-1:HOTP-SHA1-6:QA06-OSHA1, OCRA-1:HOTP-SHA1-6:QA06-T30S, OCRA-1:HOTP-SHA1-8:QN08-T30S, OCRA-1:HOTP-SHA256-6:QA06-T30S, or OCRA-1:HOTP-SHA256-8:QA08-T30S. The OCRA suite information may be, for example, values described in the RFC 6287.

The display name information may define a name in which generated token information will be shown in the electronic device 100. The shared secret information may define a seed key used to generate an OTP. The secret encryption type information may define an encryption type of a shared secret. The encryption params information may define an algorithm used when a shared secret is encrypted and other information for decrypting the shared secret. The whitelisted packages information may be information which previously defines an application to use corresponding token information.

Figure 4:
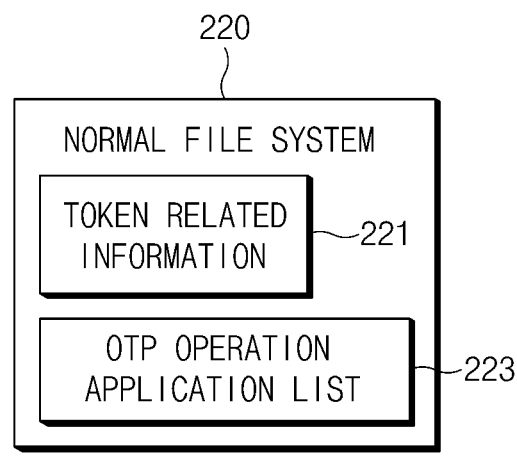
FIG. 4 is a block diagram illustrating a normal file system according to an embodiment of the present disclosure.

FIG. 4 is a block diagram illustrating a normal file system according to an embodiment of the present disclosure.

Referring to FIG. 4, a normal file system 220 according to an embodiment of the present disclosure may be a zone which stores data or programs, and the like associated with a function operated in a normal zone 200 of FIG. 2 while a function of an electronic device 100 of FIG. 1 is operated. The normal file system 220 may include token related information 221 and an OTP operation application list 223.

The token related information 221 may include information in which seed information is excluded from token information. For example, the token related information 221 may include at least one of identification information (e.g., server address information, server name information, and the like) of a server 500 of FIG. 1 that generates token information, identification information (e.g., connection information of the electronic device 100, unique information associated with the electronic device 100, such as a specific device index information or a device identification, and the like) of the electronic device 100 that receives token information, or type information of an application that sends a request for token information. Additionally, the token related information 221 may further include at least one of information about time at which token information is generated or information associated with validity of the token information. The token related information 221 may also include link information indicating connectivity with seed information. The link information may be used to classify seed information mapped to a plurality of token related information. The link information may also be used to automatically apply a generated OTP to a specific application.

The OTP operation application list 223 may include identification information of applications associated with operating an OTP. For example, the OTP operation application list 223 may include address information or identification information of the at least one server 500. When connecting to the server 500, the electronic device 100 may determine whether to operate an OTP as address information or identification information of the connected server 500. Alternatively, the electronic device 100 may provide support in operating an OTP with the predetermined server 500 included in the OTP operation application list 223. If a specific function (e.g., a cost payment function) is executed with a server that is not included in the OTP operation application list 223, the electronic device 100 may prevent the corresponding function from being executed. The OTP operation application list 223 may be updated in response to user input or control information received from outside of the electronic device 100.

According to an embodiment of the present disclosure, while maintaining portability and availability of a software token, the electronic device 100 may provide more stable security performance (e.g., performance of managing OTP secret key hacking possibility through duplication of a mobile phone and managing hacking and keys through the software (S/W) reverse engineering) without separate additional costs (e.g., costs for installing a personal firewall, a keyboard security product, a malicious code detection program, and the like).

The electronic device 100 may include a housing, a memory configured to be located in the housing, the input and output interface 150, and a processor 120 configured to electrically connect with the memory and the input and output interface 150. The memory may store instructions such that the processor sets a first zone (e.g., a normal zone) and a second zone (e.g., a secure zone) that has a higher secure level than that of the first zone, receives first information (e.g., token information) from outside of the electronic device, at least temporarily stores the received first information in the first zone, and stores second information (e.g., seed information) extracted from the first information in the second zone.

The first information may include token information.

The first information may include token information according to a direct data scheme.

The second information may include seed information for generating third information (e.g., secure operation information) that may be provided by the input and output interface 150.

The third information may include a one time password (OTP).

Each of the instructions may be set such than the processor 120 stores a predetermined secure application list in the first zone to provide support in processing the third information with a predetermined server or a predetermined application.

Each of the instructions may be set such that the processor 120 verifies a valid state of at least one of the first zone or the second zone.

Each of the instructions may be set such that the processor 120 does not process the third information, if the at least one of the first zone or the second zone is in an invalid state.

Each of the instructions may be set such that the processor 120 decrypts the second information and stores the decrypted information in the second zone.

Each of the instructions may be set such that the processor 120 stores encrypted second information in the second zone and decrypts and uses the encrypted second information when there is a request for using the second information.

The memory may include a first memory and a second memory spaced apart from the first memory. The first zone may be set in the first memory. The second zone may be set in the second memory.

Each of the instructions may be set such that the processor stores, in the first zone, information, in which fourth information (e.g., token related information) extracted from the first information is mapped with the second information.

The electronic device 100 may include a normal zone 200 configured to store token related information in which seed information is extracted, a secure zone 300 configured to store the seed information used to generate predetermined secure operation information, and a processor 120 configured to extract the seed information from token information obtained in the normal zone 200 and to store the extracted seed information in the secure zone 300.

Figure 5:
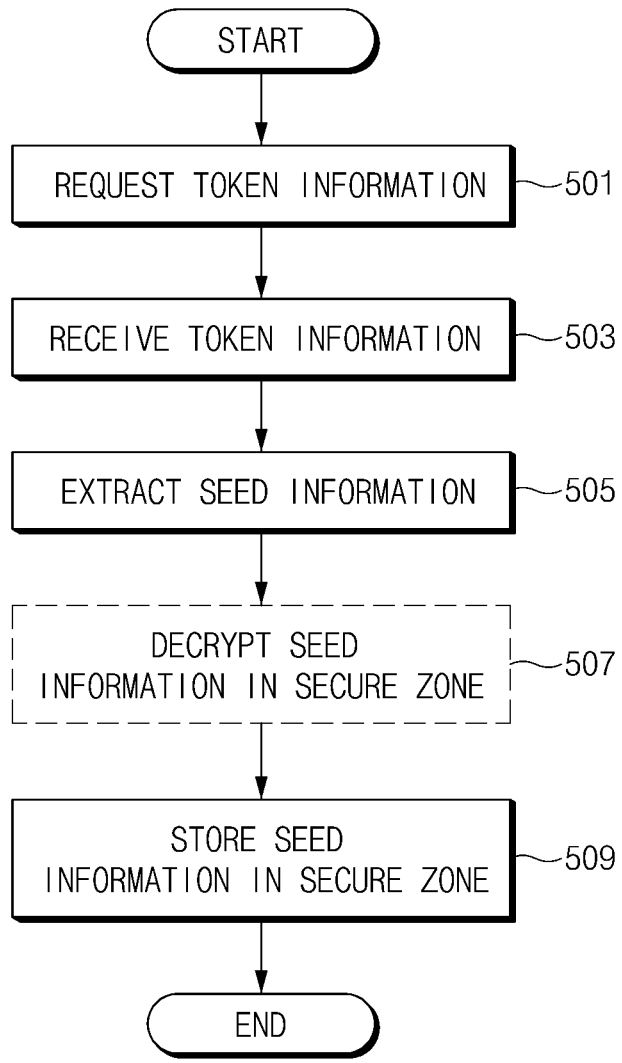
FIG. 5 is a flowchart illustrating a method for operating an electronic device in connection with storing secure information according to an embodiment of the present disclosure.

FIG. 5 is a flowchart illustrating a method for operating an electronic device in connection with storing secure information according to an embodiment of the present disclosure.

Referring to FIG. 5, in a method for operating an electronic device, in step 501, a processor 120 of FIG. 1 sends a request to a server 500 of FIG. 1 for token information. In step 501, the processor 120 may perform an authentication process (e.g., a process of entering an ID and a password) requested by the server 500 according to a user input. In step 503, the processor 120 receives requested the token information in response to the request for the token information. In this regard, the processor 120 may perform an input setting (e.g., an output of an icon or a menu item associated with executing an OTP application 210 of FIG. 2) that may execute a related function. If seed information is requested, the processor 120 may execute the related OTP application 210 and may access the predetermined server 500 according to the executed OTP application 210. The processor 120 may request the corresponding server 500 to transmit token information including seed information. In connection with requesting and receiving the token information, the OTP application 210 may verify a connection with an OTP framework 230 of FIG. 2 and may receive data (e.g., the token information) associated with an OTP environment from the corresponding server 500.

In step 505, the processor 120 extracts the seed information from the received token information. For example, the processor 120 may extract encrypted seed information from the token information in a normal zone 200 of FIG. 2 and may transmit the extracted seed information to the secure zone 300 through a secure zone interface 250 of FIG. 2. In step 505, the processor 120 may store other information except for the seed information (e.g., token related information 221 of FIG. 4) in a normal file system 220 of FIG. 2. The processor 120 may also map the stored token related information 221 with the seed information (e.g., may enter token related information for executing a predetermined application and information indicating seed information).

In step 507, the processor 120 decrypts the seed information in the secure zone 300. The processor 120 may decrypt encrypted seed information in the secure zone 300 to store the encrypted seed information transmitted from the normal zone 200. Herein, the processor 120 may inspect data validity of the transmitted seed information (e.g., that there is no hacking or rooting possibility of the electronic device 100). The processor 120 may control operation of an OTP secure application 310 and may decrypt the seed information. The process of decrypting the seed information in step 507 described above may be omitted in accordance with embodiments of the present disclosure. For example, the processor 120 may not perform a separate decryption operation of seed information. In this case, step 507 may be omitted.

In step 509, the processor 120 stores the seed information in the secure zone 300. For example, the OTP application 210 may store the seed information in the predetermined secure file system 330. After storing the seed information, the processor 120 may transmit a message associated with storing the seed information. For example, the secure zone 300 may transmit the message associated with storing the seed information to the normal zone 200. In the process of storing the seed information, the processor 120 may send a request to the secure zone 300 to generate an account to store the seed information.

In the above-described example, one processor 120 separately operates the normal zone 200 and the secure zone 300. Embodiments of the present disclosure are not limited thereto. For example, the processor 120 may include a processor associated with operating the normal zone 200 and another processor associated with operating the secure zone 300. Each of the processors may transmit seed information through a secure zone interface and may guide seed information to be stored.

The processor 120 may verify whether a process authorized in connection with an OTP is transmitted from the normal zone 200 to the secure zone 300, may receive encrypted seed information through the authorized process, and may decrypt and store selected seed information.

The processor 120 may store decrypted seed information in the secure zone 300. For example, if it is possible to decrypt seed information whenever the seed information is used, the processor 120 may store encrypted seed information. Alternatively, if it is possible to encrypt seed information whenever the seed information is used, the processor 120 may store decrypted seed information. The processor 120 may provide support in authenticating the OTP application 210 through the server 500 when the OTP application 210 is executed and executing the OTP application 210 in a state where the OTP application 210 is authenticated.

Figure 6:
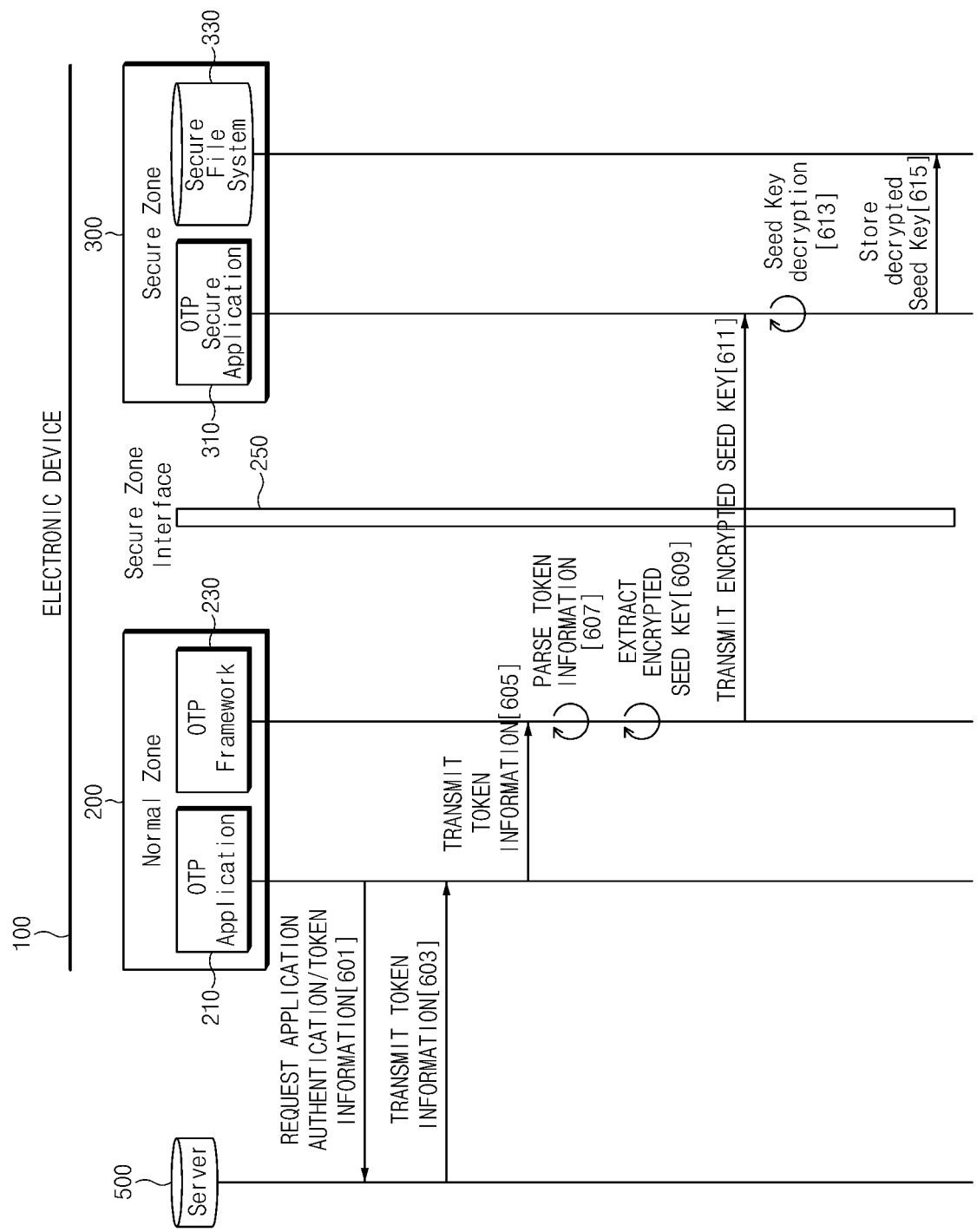
FIG. 6 is a signal sequence diagram illustrating a method for operating an electronic device in connection with storing secure information according to an embodiment of the present disclosure.

FIG. 6 is a signal sequence diagram illustrating a method for operating an electronic device in connection with storing secure information according to an embodiment of the present disclosure.

Referring to FIG. 6, in step 601, an OTP application 210 disposed in a normal zone 200 of an electronic device 100 requests a server 500 to authenticate the OTP application 210 and transmit token information. In step 601, the OTP application 210 may provide support in entering, for example, predetermined user ID information and predetermined password information. The server 500 may generate token information in response to the OTP application 210 and the electronic device 100. In step 603, the server 500 transmits the generated token information to the OTP application 210. In step 605, the OTP application 210 transmits the token information to an OTP framework 230.

In step 607, the OTP framework 230 parses (or extracts) the token information transmitted from the OTP application 210. In step 609, the OTP framework 230 extracts encrypted seed information (e.g., an encrypted seed key). In step 611, the OTP framework 230 transmits the encrypted seed key to an OTP secure application 310 through a secure zone interface 250.

In step 613, the OTP secure application 310 decrypts the encrypted seed key to generate the seed key. In step 615, the OTP secure application 310 stores the seed key in a secure file system 330.

Figure 7:
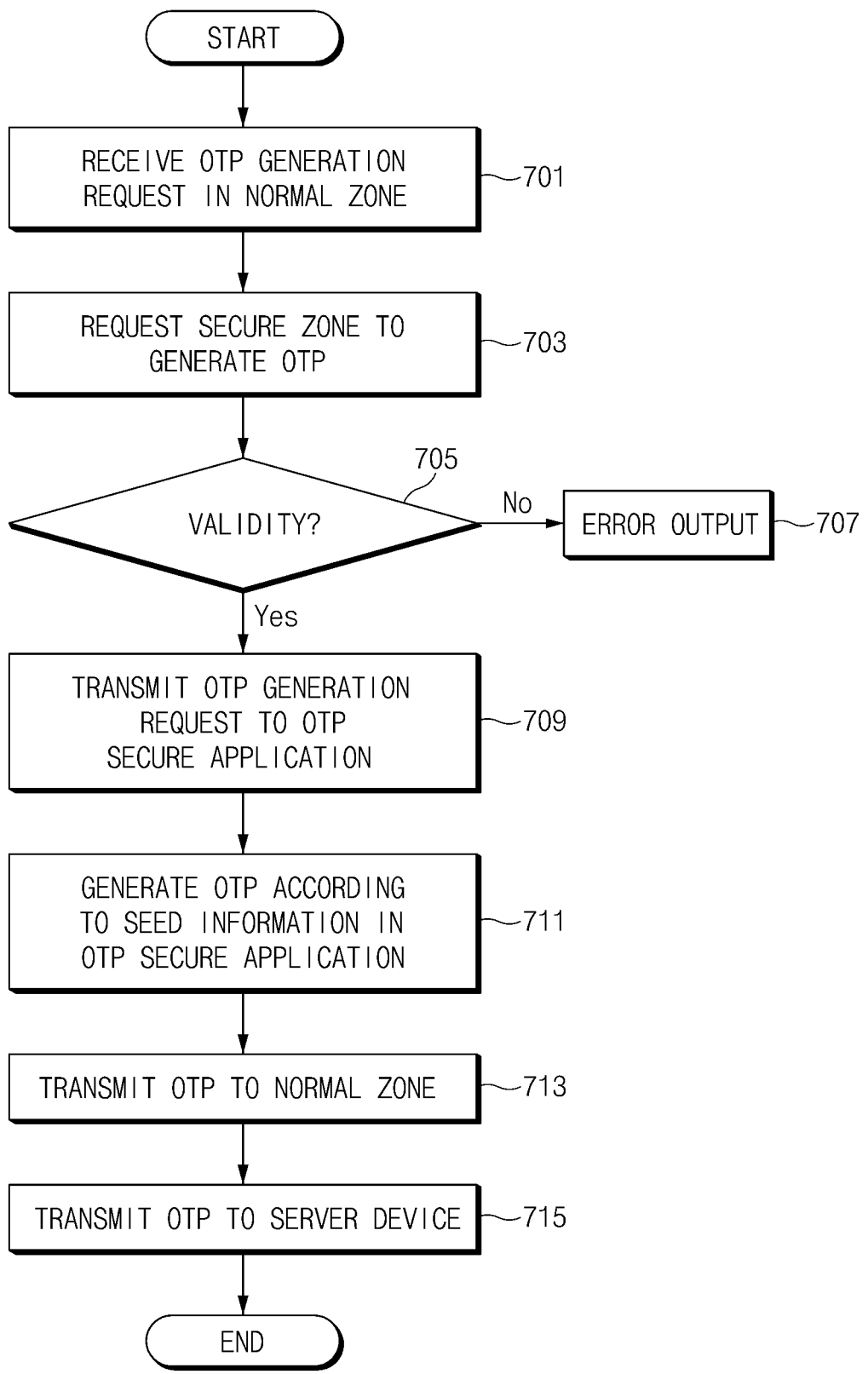
FIG. 7 is a flowchart illustrating a method for operating an electronic device in connection with generating secure information according to an embodiment of the present disclosure.

FIG. 7 is a flowchart illustrating a method for operating an electronic device in connection with generating secure information according to an embodiment of the present disclosure.

Referring to FIG. 7, a method for operating an electronic device in connection with generating secure information, in step 701, a processor 120 of an electronic device 100 of FIG. 1 may receive a request for generating an OTP in a normal zone 200 of FIG. 2. In this regard, the processor 120 may perform control to output an icon or a menu item associated with executing an OTP application 210 of FIG. 2. Alternatively, the processor 120 may receive a request for executing the OTP application 210 by an external input (e.g., near field communication (NFC) tagging or establishing a local-area communication channel associated with operating an OTP).

If the OTP application 210 receives the OTP generation request, in step 703, the processor 120 may request an OTP secure zone 300 of FIG. 2 to generate an OTP through an OTP framework 230 and a secure zone interface 250 of FIG. 2. In step 703, although not illustrated, the processor 120 may check validity of an OTP generation request instruction or the OTP application 210 in the OTP framework 230 and may request the OTP secure zone 300 to generate an OTP through the secure zone interface 250.

If the OTP generation request is received, in step 705, the processor 120 checks the validity of the electronic device 100. For example, the processor 120 may verify whether the electronic device 100 maintains integrity (e.g., a state where rooting or hacking is not generated) using a secure verification module 320 of FIG. 2 disposed in the secure zone 300. If the integrity is not maintained, in step 707, the processor 120 performs an error output. For example, the processor 120 may control output of information indicating that the electronic device 100 is in a rooted or hacked state.

If the electronic device 100 is validated (e.g., if the integrity of the electronic device 100 is maintained), in step 709, the processor 120 transmits the OTP generation request to the OTP secure application 310.

In step 711, the processor 120 provides support in generating an OTP according to seed information in the OTP secure application 310. In this regard, the processor 120 may read seed information stored in a secure file system 330 of the secure zone 300 and may generate an OTP according to an OTP algorithm to which the read seed information is applied.

In step 713, the processor 120 transmits the generated OTP to the normal zone 200. For example, the processor 120 may transmit the generated OTP to the OTP application 210 of the normal zone 200 through a secure zone interface 250. In step 715, the processor 120 controls the OTP application 210 to transmit the OTP to a predetermined server 500.

A method for operating the electronic device according to an embodiment of the present disclosure may include transmitting an OTP generation request in the normal zone 200 to the secure zone 300, generating an OTP according to seed information stored in the secure zone 300 of the electronic device 100, and transmitting the generated OTP to the normal zone 200.

The method may further include receiving predetermined pin information of a user. Also, the electronic device 100 may store the pin information of the user in the secure zone 300 through an authorized process (e.g., a process in which the server 500 transmits predetermined information to the electronic device 100 and the user verifies information output from the electronic device 100 and manually enters information).

The electronic device 100 may also apply stored seed information and the pin information of the user as an OTP generation factor or a parameter to generate an OTP.

In the above-described example, the processor 120 operates the normal zone 200 and the secure zone 300 together. However, the scope and spirit of the present disclosure is not limited thereto. The processor 120 may include a normal processor associated with the normal zone 200 and a secure processor associated with the secure zone 300.

Figure 8:
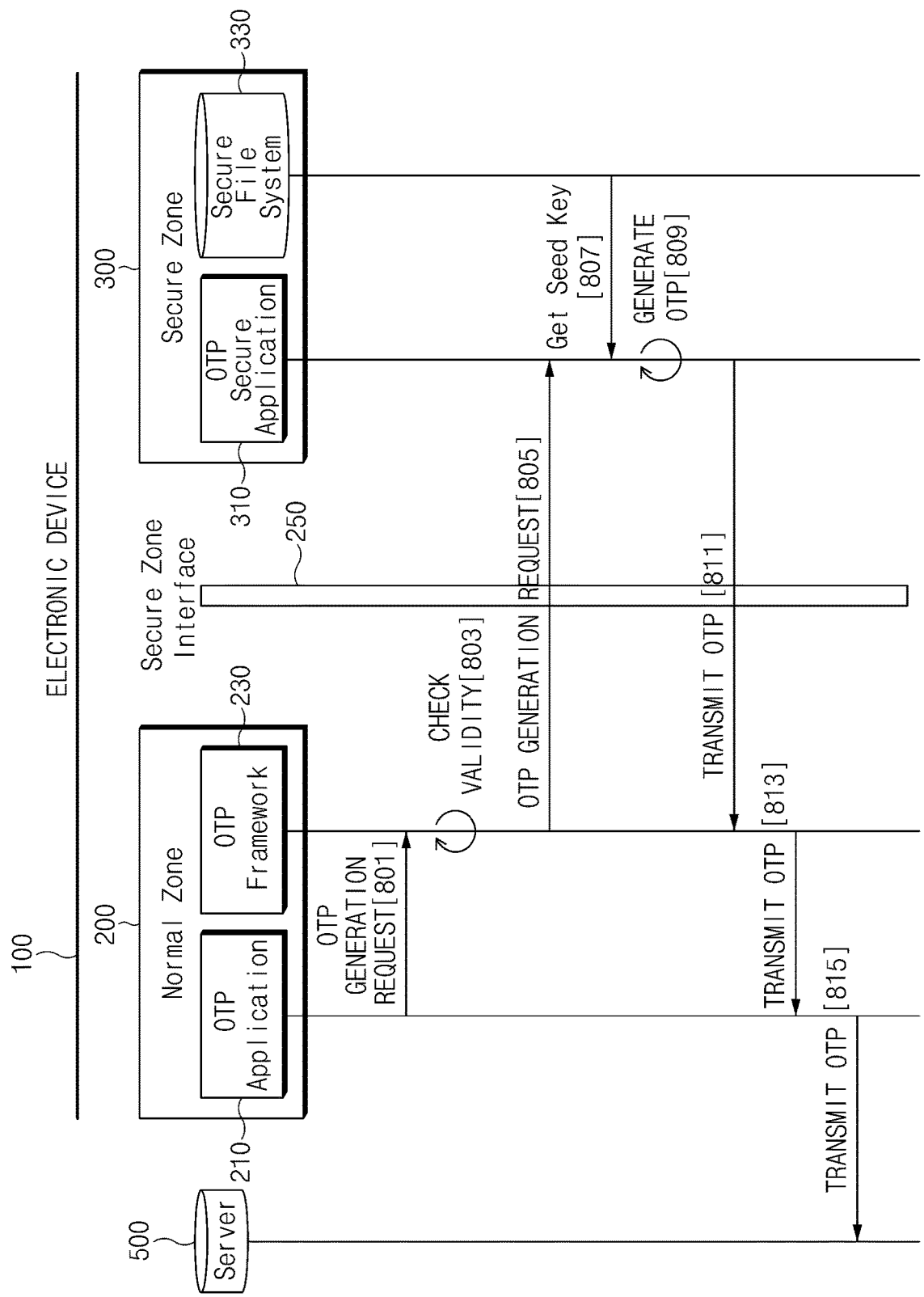
FIG. 8 is a signal sequence diagram illustrating a method for operating an electronic device in connection with generating secure information according to an embodiment of the present disclosure.

FIG. 8 is a signal sequence diagram illustrating a method for operating an electronic device in connection with generating secure information according to an embodiment of the present disclosure.

Referring to FIG. 8, in connection with generating secure information, in step 801, an OTP application 210 of an electronic device 100 transmits an OTP generation request to an OTP framework 230. In this regard, the OTP application 210 may transmit the OTP generation request to the OTP framework 230 in response to a request for obtaining application OTP information or a request for executing a predetermined routine (e.g., receiving a request for providing an OTP from a server 500).

In step 803, the OTP framework 230 checks validity. For example, the OTP framework 230 may verify validity of the OTP generation request or may verify whether the OTP application 210 is normal, to verify validity of a package or a signature. If the OTP application 210 is verified as normal, in step 805, the OTP framework 230 transmits the OTP generation request to an OTP secure application 310.

In checking the validity, if it is determined that the OTP application 210 is valid, in step 805, the OTP framework 230 may transmit the OTP generation request to the OTP secure application 310. In this operation, the OTP framework 230 may transmit the OTP generation request to the OTP secure application 310 through a secure zone interface 250. Herein, at least a part of token related information 221 of FIG. 4 may be included in a message associated with the OTP generation request. In step 805, although not illustrated, the OTP framework 230 may verify whether validity of the electronic device 100 is maintained (e.g., a state where the electronic device 100 is not in a hacked state such as a rooted state) in the secure zone 300. If the electronic device 100 has the validity (e.g., if the validity of the electronic device 100 is maintained), the OTP framework 230 may transmit the OTP generation request to the OTP secure application 310.

In step 807, the OTP secure application 310 obtains seed information (e.g., a seed key). For example, the OTP secure application 310 may check a predetermined zone of a secure file system 330 and may detect the seed key. In step 807, the OTP secure application 310 may read a seed key, which is associated with the token related information received from the OTP framework 230, from the secure file system 330. In step 809, the OTP secure application 310 generates an OTP using the read seed key and the related OTP generation algorithm. In step 811, the OTP secure application 310 transmits the generated OTP to the OTP framework 230 through the secure zone interface 250.

In step 813, the OTP framework 230 transmits the OTP received from the OTP secure application 310 to the OTP application 210. In step 815, the OTP application 210 transmits the OTP received from the OTP framework 230 to the server 500.

Figure 9:
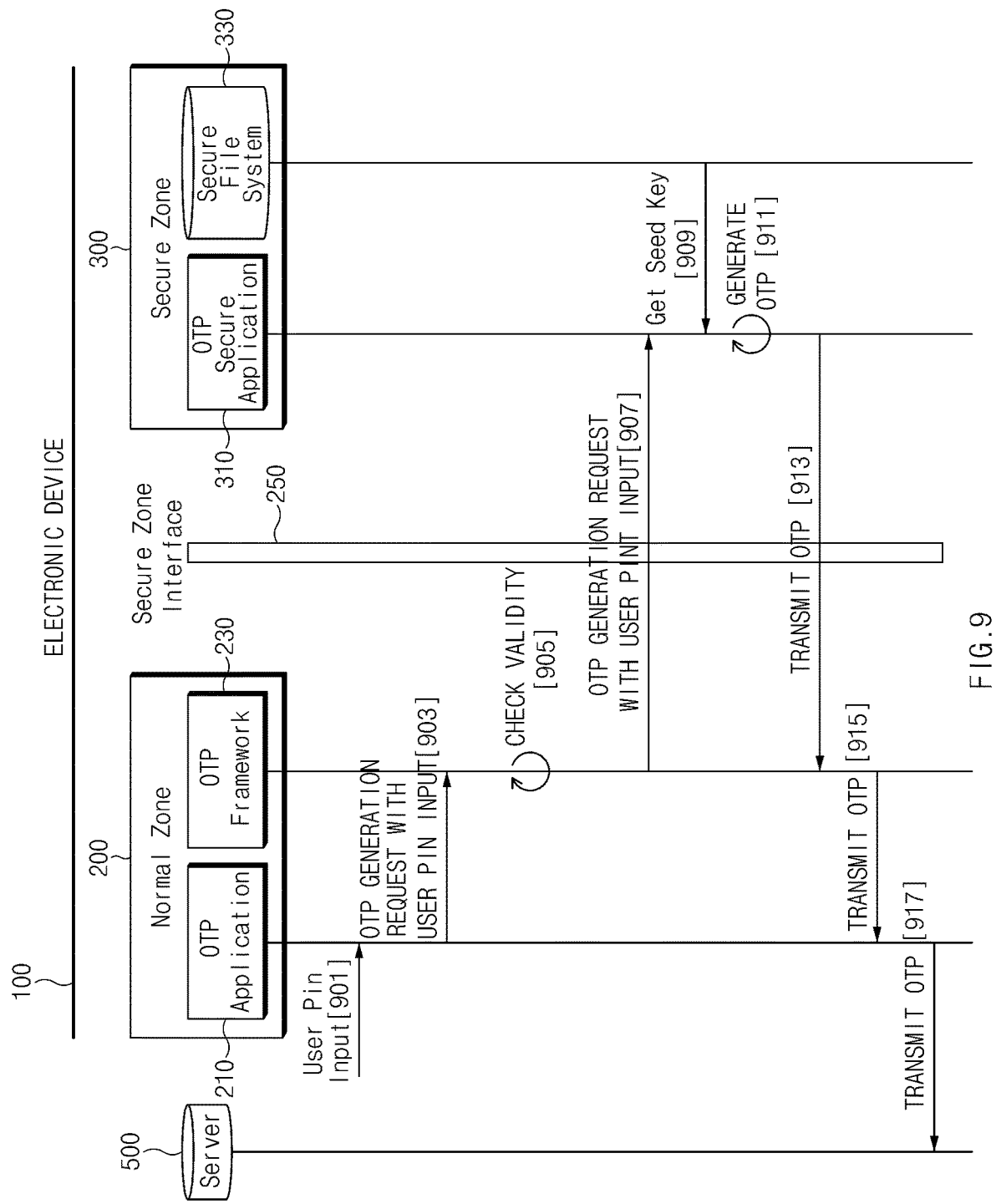
FIG. 9 is a signal sequence diagram illustrating a method for operating an electronic device in connection with generating secure information according to an embodiment of the present disclosure.

FIG. 9 is a signal sequence diagram illustrating a method for operating an electronic device in connection with generating secure information according to an embodiment of the present disclosure.

Referring to FIG. 9, in step 901, if a request for generating an OTP is received, an OTP application 210 of an electronic device 100 receives input of a user pin input. In this regard, the OTP application 210 may process the receipt of the user pin input. For example, the OTP application 210 may receive and output user pin information to be entered from a server 500. Alternatively, the OTP application 210 may request a user to perform a user pin input provided by a predetermined algorithm. If a predetermined user pin input is not performed, the OTP application 210 may output predetermined error information without performing an OTP generation request.

If the user pin input is received, in step 903, the OTP application 210 transmits an OTP generation request message including the received user pin input to an OTP framework 230. In step 905, the OTP framework 230 checks validity of the received user pin input. If it is determined that the user pin input is valid, in step 907, the OTP framework 230 transmits the OTP generation request message including the user pin input information to an OTP secure application 310 through a secure zone interface 250.

In response to receiving the OTP generation request message, in step 909, the OTP secure application 310 obtains seed information (e.g., a seed key) from a secure file system 330 with reference to the received OTP generation request message. In step 911, the OTP secure application 310 generates an OTP according to the obtained seed key and the user pin input information included in the OTP generation request message. In step 913, the OTP secure application 310 transmits the generated OTP to the OTP framework 230 through the secure zone interface 250.

In step 915, the OTP framework 230 transmits the received OTP to the OTP application 210. In step 917, the OTP application 210 transmits the received OTP to the server 500.

Figure 10:
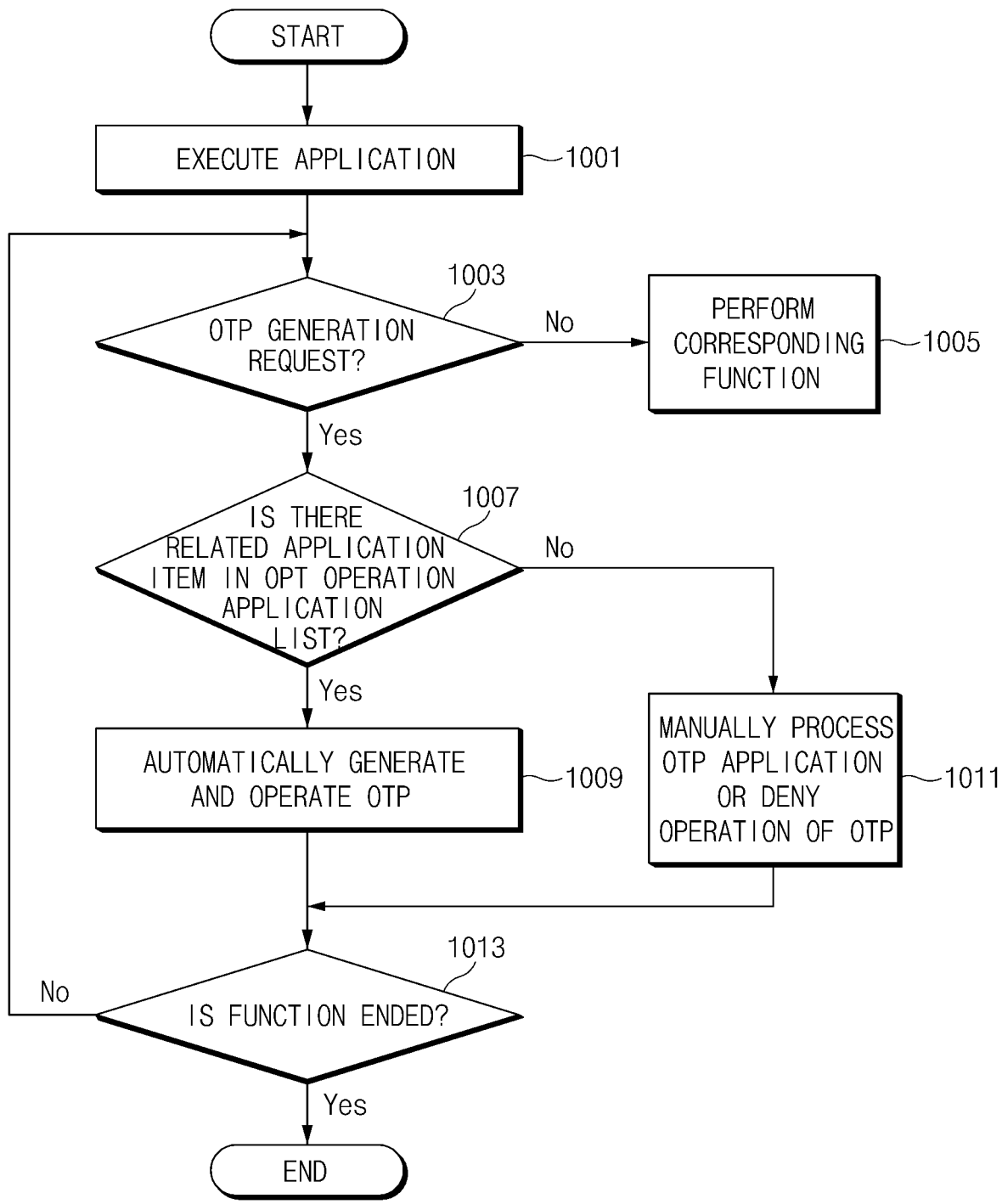
FIG. 10 is a flowchart illustrating a method for operating an electronic device in connection with operating a list according to an embodiment of the present disclosure.

FIG. 10 is a flowchart illustrating a method for operating an electronic device in connection with operating a list according to an embodiment of the present disclosure.

Referring to FIG. 10, in a method for operating an electronic device associated with operating a list, in step 1001, a processor 120 of an electronic device 100 of FIG. 1 executes an application. In performing step 1001, the processor 120 may output an icon or a menu item, corresponding to at least one application associated with operating an OTP, on a display 160 of FIG. 1.

If an event is generated, in step 1003, the processor 120 may verify whether an event associated with an OTP generation request is generated. If an event that is not associated with the OTP generation request is generated, in step 1005, the processor 120 controls performance of a corresponding function according to a type of the generated event.

If the event associated with the OTP generation request is generated, in step 1007, the processor 120 verifies whether a related application item is present in an OTP operation application list 223 of FIG. 4 stored in a normal file system 220 of FIG. 4. The OTP operation application list 223 may be generated by a user of the electronic device 100 or may be received from a predetermined server. Also, the OTP operation application list 223 may be updated by the user or the predetermined server.

If an item of an application that transmits an OTP generation request is included in the OTP operation application list 223, in operation 1009, the processor 120 automatically generates and operates an OTP. For example, the processor 120 may control operation of an OTP application 210 of FIG. 2 and may verify a connection with an OTP framework 230 of FIG. 2. The processor 120 may transmit an OTP generation instruction that has token identification (e.g., a token ID used to classify necessary tokens from among a plurality of tokens) as a factor to generate an OTP.

In step 1009, the processor 120 may check validity of the connection with the OTP framework 230 according to operation of the OTP framework 230 and may transmit an OTP generation instruction to the OTP secure application 310 of the secure zone 300. The OTP secure application 310 may provide a request to input a pin or a challenge, if necessary, according to an OTP generation algorithm. The processor 120 may provide a request to input a pin or a challenge associated with operating the OTP application 210. The processor 210 may generate an OTP according to stored seed information in connection with operating the OTP secure application 310 and may return the generated OTP to the OTP application 210.

In step 1007, if it is determined that the application item is not present in the OTP operation application list 223, in step 1011, the processor 120 manually processes the OTP application 210 or denies operation of the OTP. The processor 120 may display a plurality of token related information in connection with operating the OTP application 210, such that the user may select the displayed token related information. Alternatively, the processor 120 may display a plurality of OTPs in connection with operating the OTP application 210, such that the user may select the displayed OTP.

The processor 120 may proceed to control transmission of a request for entering predetermined account information and a predetermined password in connection with operating the OTP application 210. If correct information is entered, the processor 120 may proceed to an OTP generation procedure. The processor 120 may output predetermined error information without proceeding with a separate OTP generation procedure in connection with operating the OTP application 210. For example, the processor 120 may control output of information indicating that an application that is not included in the OTP operation application list 223 will not proceed with generating an OTP. The processor 120 may also control output of information indicating that a corresponding application is first included in the OTP operation application list 223 and will proceed with generating an OTP.

In step 1013, the processor 120 may verify whether an event associated with ending a function is generated. If the event associated with ending the function is not generated, the processor 120 may branch to step 1003 (or step 1001) and may repeat the processing from step 1003 (or step 1001). If the event associated with ending the function is generated, the processor 120 may end the execution of the OTP application 210. The processor 120 may control a state before the OTP application 210 is executed or may perform control to process a predetermined function according to a user input.

The method for operating the electronic device 100 may include receiving first information (e.g., token information) from a first zone (e.g., the normal zone 200) of a memory of the electronic device 100, extracting second information (e.g., seed information) based on the first information in the first zone of the memory, and storing the second information in a second zone (e.g., the secure zone 300) of the memory of the electronic device 100, which has a higher secure level than that of the first zone.

The first information may include token information.

The first information may include token information according to a direct data scheme.

The second information may include seed information for generating third information (e.g., secure operation information) associated with operating a secure function.

The third information may include a one time password (OTP).

The method may further include storing information, in which fourth information (e.g., token related information) in which the at least second information is excluded from the first information is mapped with the second information, in the first zone.

The method for operating the electronic device may include receiving token information in a normal zone of the electronic device, extracting seed information from the token information in the normal zone of the electronic device, and storing the seed information in a secure zone of the electronic device.

The method may further include storing a predetermined secure application list in the normal zone to provide support in processing secure operation information with a predetermined server or a predetermined application.

The method may further include performing at least one of automatically generating the secure operation information when executing an application included in the secure application list or denying generating the secure operation information when executing an application which is not included in the secure application list.

The method may further include verifying a valid state of at least one of the normal zone or the secure zone and stopping processing the secure operation information if the at least one of the normal zone or the secure zone is in an invalid state.

The storing of the second information may include at least one of decrypting the seed information and storing the decrypted seed information or storing encrypted seed information in the secure zone.

The method may further include receiving a request for generating secure operation information in the normal zone, generating the secure operation information according to the seed information, and transmitting the secure operation information to the normal zone.

Generating the secure operation information may include at least one of generating time-based secure operation information according to a type of requested secure operation information or generating event-based secure operation information according to a type of requested secure operation information.

Figure 11:
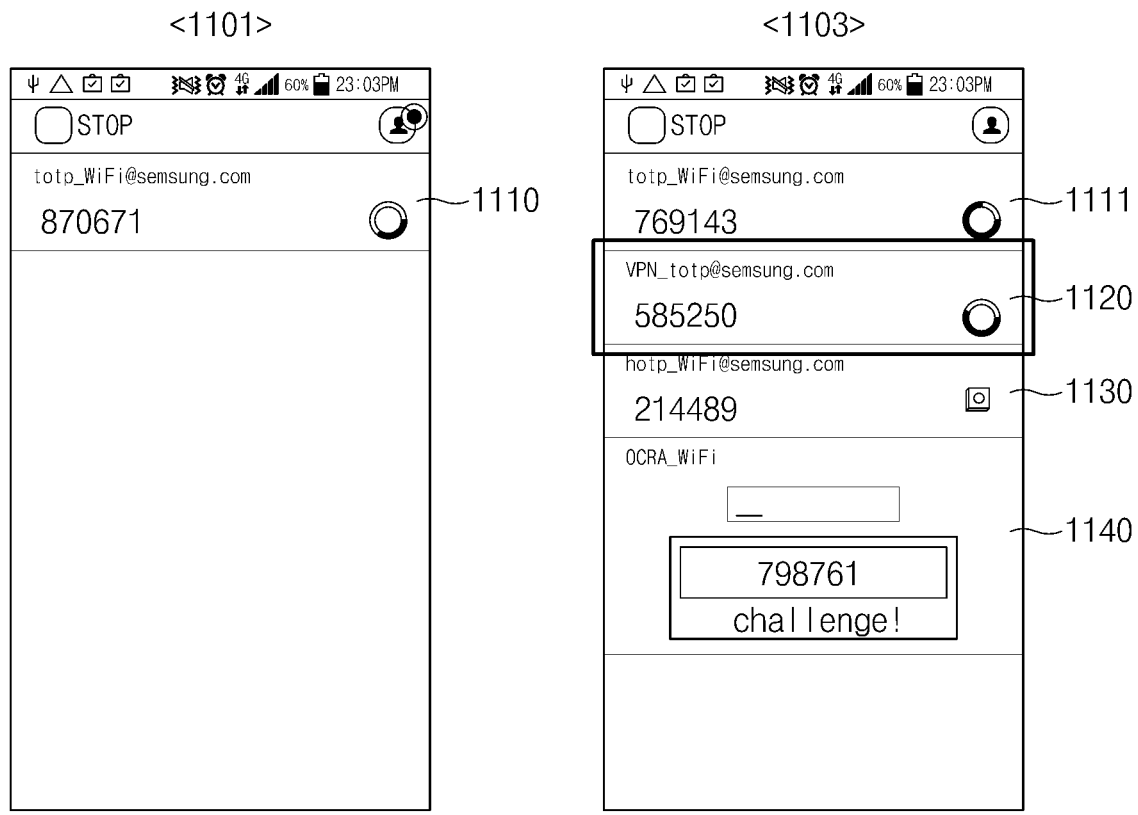
FIG. 11 is a diagram illustrating a screen interface associated with storing secure information according to an embodiment of the present disclosure.

FIG. 11 is a diagram illustrating a screen interface associated with storing secure information according to an embodiment of the present disclosure.

Referring to FIG. 11, an electronic device 100 of FIG. 1 may output OTP information 1110 on a screen 1101 according to a user input or in response to generating a related event. The displayed OTP information 1110 may be, for example, TOTP related OTP information. According to an embodiment of the present disclosure, if the OTP information 1110 is time-based OTP information, the OTP information 1110 may include an image (e.g., a ring image disposed at the right-hand side of a corresponding object) for guiding a time lapse.

The electronic device 100 may obtain a plurality of token information from at least one server and may extract seed information from the corresponding token information. The electronic device 100 may store the extracted seed information in a secure zone 300 of FIG. 2 and may generate OTP information according to a user request or in response to a request of an OTP application 210 of FIG. 2. Therefore, the electronic device 100 may output the generated first to fourth OTP information 1111, 1120, 1130, and 1140 on a display 160 of FIG. 1.

The electronic device 100 may output the time-based first OTP information 1111 on a screen 1103. The electronic device 100 may output the second OTP information 1120 generated according to a different type of token information of each of the server and a different server. The electronic device 100 may store and operate seed information, associated with generating the second OTP information 1120, in the secure zone 300. The first OTP information 1111 or the second OTP information 1120 may be changed in response to a time lapse or per predetermined time.

The electronic device 100 may output the event-based third OTP information 1130. In this regard, the electronic device 100 may store and operate an algorithm, associated with generating the event-based third OTP information 1130, and the seed information, associated with generating the third OTP information 130, in the secure zone 300. The third OTP information 1130 may be OTP information generated when a corresponding application is executed or when an event for selecting a predetermined object is generated.

The electronic device 100 may output the fourth OTP information 1140 according to a direct data input (e.g., an OCRA). In this regard, the electronic device 100 may include an OTP application 210 of FIG. 2 for requesting a server 500 of FIG. 1 to transmit information to be directly input. When transmitting a request for executing the corresponding OTP application 210, the electronic device 100 may request the server 500 to transmit information to be directly input. If receiving the information to be directly input from the server 500, the electronic device 100 may output the received information on a pop-up window and the like. When outputting the information on the pop-up window, the electronic device 100 may automatically output a virtual keypad for a direct input.

Figure 12:
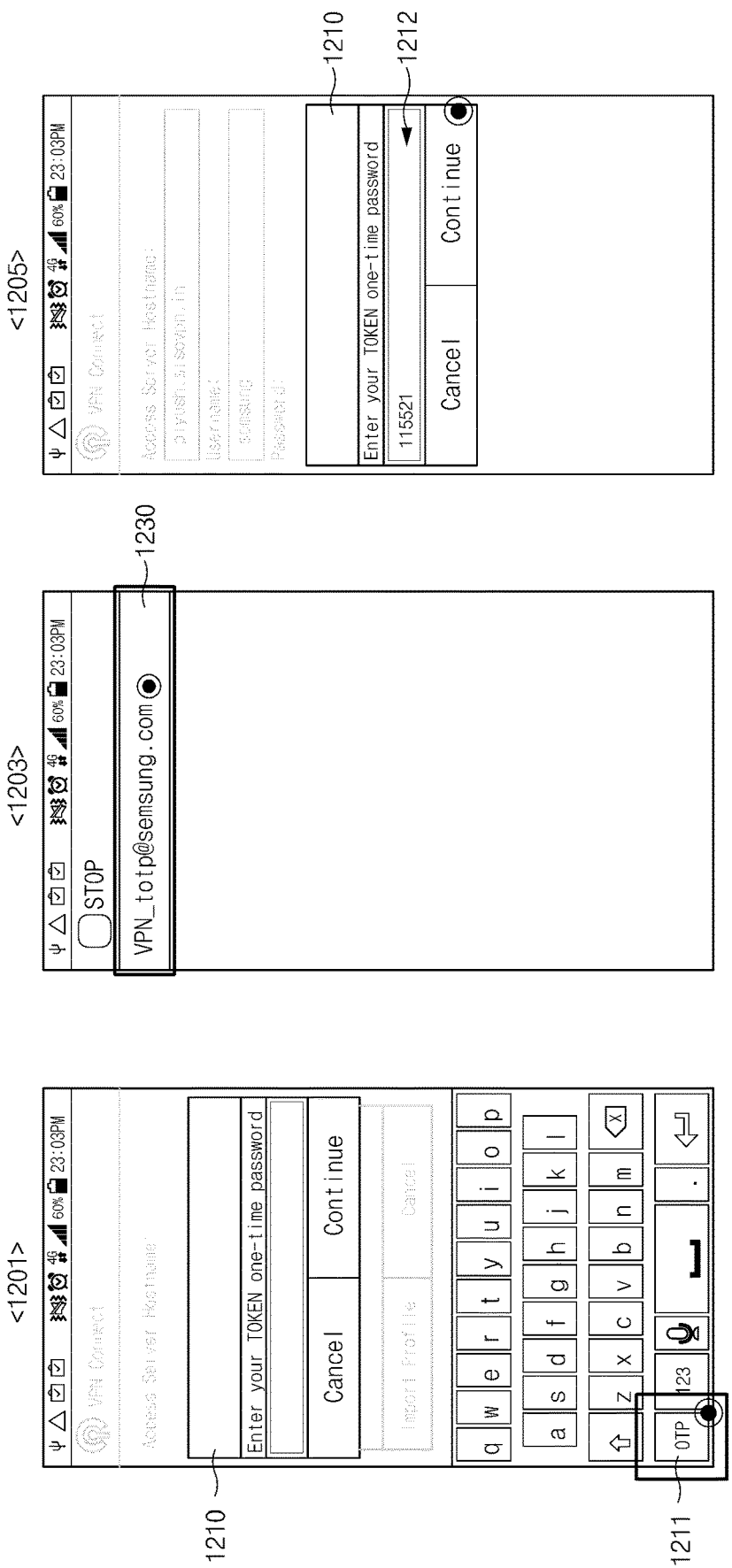
FIG. 12 is a diagram illustrating a screen interface associated with generating and operating secure information according to an embodiment of the present disclosure.

FIG. 12 is a diagram illustrating a screen interface associated with generating and operating secure information according to an embodiment of the present disclosure.

Referring to FIG. 12, in response to executing an OTP application 210 of FIG. 2, an electronic device 100 of FIG. 1 may provide the input and output interface 150 on a screen 1201. The electronic device 100 may output an OTP input request region 1210 (e.g., a pop-up window) and a virtual keypad for entering information. The virtual keypad may include virtual keys corresponding to corresponding keys to enter a number or a character, and the like. The virtual keypad may include an OTP generation request key 1211 which may directly transmit a request for generating an OTP.

If the OTP generation request key 1211 is selected (if the server item 1230 is not selected after the electronic device 100 verifies whether a server item 1230 is selected), the electronic device 100 may output the server item 1230 to be connected on a screen 1203. The server item 1230 may connect with server address information or server connection information associated with the OTP application 210. The server item 1230 may be an item included in an OTP operation application list 223 of FIG. 4.

If an input event for selecting the server item 1230 is generated, the electronic device 100 may connect with a server selected through the server item 1230 and may perform operations (e.g., steps 601 to 615 of FIG. 6) for generating an OTP. If the operations for generating the OTP are completed, the electronic device 100 may generate the OTP (e.g., steps 801 to 815 of FIG. 8), may display an automatic OTP input region 1212, in which the generated OTP is automatically entered, on a screen 1205, and may perform OTP authentication although a user separately enters the OTP.

Figure 13:
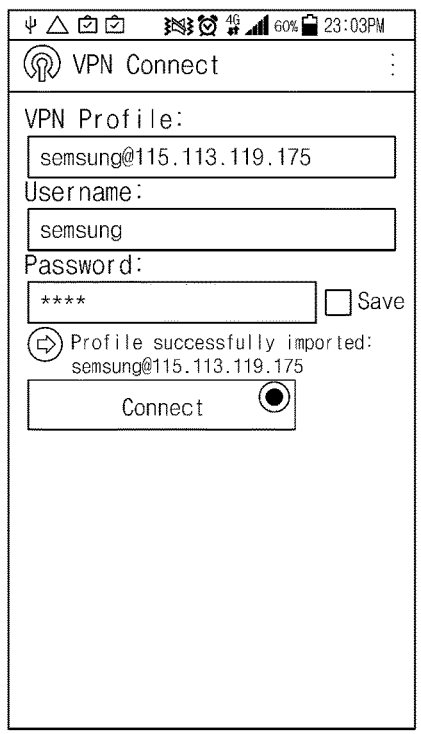
FIG. 13 is a diagram illustrating a screen interface associated with generating and operating secure information according to an embodiment of the present disclosure.
Figure 13:
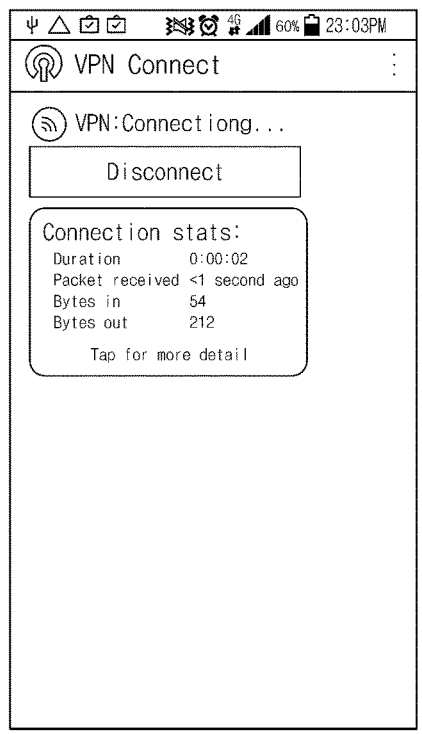
Figure 13:
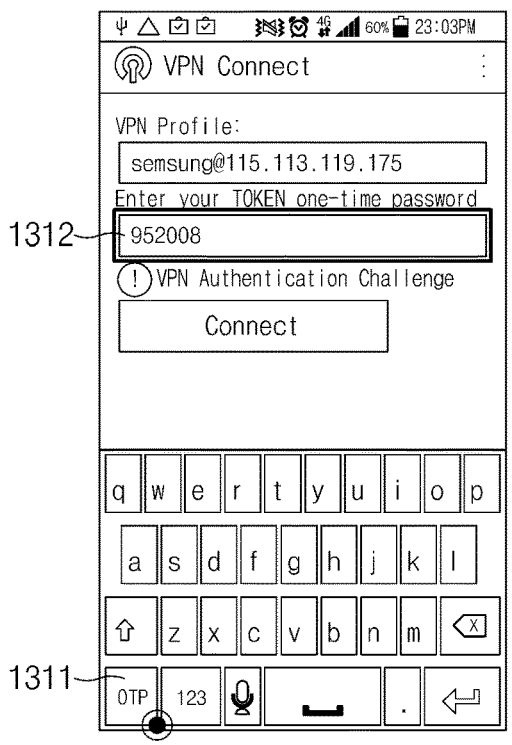
Figure 13:
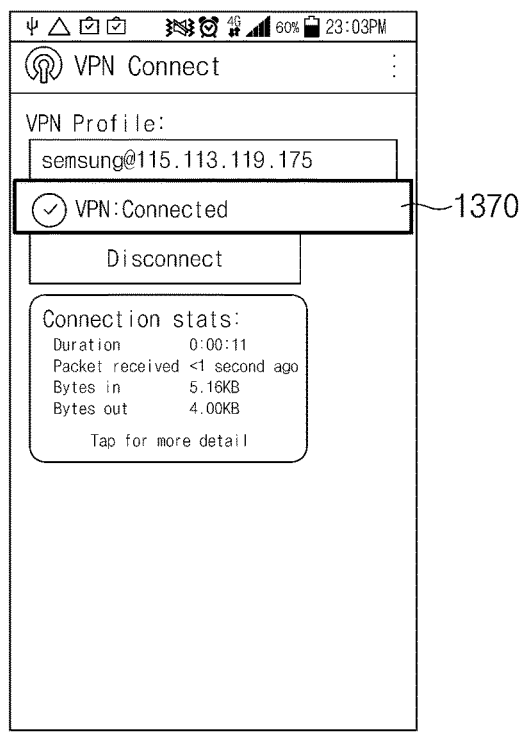

FIG. 13 is a diagram illustrating another screen interface associated with generating and operating secure information according to an embodiment of the present disclosure.

Referring to FIG. 13, an electronic device 100 of FIG. 1 may use OTP information associated with accessing a predetermined server 500 of FIG. 1. In this regard, the electronic device 100 may display an icon or a menu item which may access the predetermined server 500. When the corresponding icon or menu item is selected, the electronic device 100 may output a server access request screen on a screen 1301. The server access request screen may be with accessing a secure site and may be received from the predetermined server 500. After user information (e.g., a user name) and a password are entered and profile information (e.g., a virtual private network (VPN) profile) is entered, if a connection item is selected, the electronic device 100 may proceed with a procedure for accessing a corresponding server on a screen 1303. According to this procedure, the electronic device 100 may output a connection state and the like from the server 500.

Along with connecting with the server 500, the server 500 may request the electronic device 100 to enter a predetermined OTP. In this regard, the electronic device 100 may output an OTP input request screen of the server 500 on a screen 1305. The electronic device 100 may output an OTP information input region 1312. The electronic device 100 may output a virtual keypad for entering OTP information together. As described above, the virtual keypad may include an OTP generation request key 1311 for generating an OTP. If the OTP generation request key 1311 is selected, the electronic device 100 may generate an OTP according to token related information and seed information associated with a currently executed application or the server 500. The electronic device 100 may automatically enter the generated OTP information in the OTP information input region 1312. Therefore, when the OTP generation request key 1311 included in the virtual keypad is selected, the electronic device 100 may immediately enter the OTP information.

If the entered OTP information is valid, the server 500 may grant a secure access of the electronic device 100 and may provide a screen corresponding to the secure access to the electronic device 100. Therefore, the electronic device 100 may output a server access screen on a screen 1307. The screen 1307 may output, for example, an access state region 1370 to indicate that the electronic device 100 is currently accessing the server 500. Additionally, the electronic device 100 may output a virtual key button (e.g., a disconnect button) for ending access to the server 500.

As described above, the electronic device 100 may obtain an advantage of a hardware token and an advantage of a software token, may secure security of a hardware token level, and expand its portability. Also, a service provider may provide a stable service at a relatively lower cost. For example, banks and OTP providers issue and maintenance costs required for operating a conventional hardware token.

The method for operating the electronic device may be used to log in to the electronic device 100. Also, the electronic device 100 may use OTP information and a pattern or pin as double factor authentication elements. Also, according to an embodiment of the present disclosure, control of OTP authentication of a lost electronic device may be prevented, in order to prevent abnormal payment based on the lost electronic device.

The electronic device 100 may interwork with a mobile payment method and may provide more stable user authentication. The electronic device 100 may use OTP information other than a set password as double factor authentication elements in an environment for processing a specific function (e.g., a trusted execution environment (TEE)). The electronic device 100 may use OTP information as an authentication means when a card payment is performed online. The electronic device 100 may provide an authentication service using OTP information other than means such as a certificate and an easy payment ID. The electronic device 100 may also provide support in using a VPN application associated with a secure access.

As described above, the electronic device 100 may include a normal zone 200 configured to operate secure operation information, a secure zone 300 configured to store seed information necessary for generating the secure operation information, and a processor 120 configured to generate the secure operation information according to the seed information in response to a request of the normal zone and to transmit the generated secure operation information to the normal zone.

The processor 120 may generate and output time-based secure operation information according to a type of requested secure operation information or may generate and output event-based secure operation information according to a type of requested secure operation information.

The processor 120 may store a predetermined secure application list in the normal zone to provide support in processing secure operation information with a predetermined server or a predetermined application.

According to an embodiment of the present disclosure, when an application included in the secure application list is executed, the processor may automatically generate the secure operation information. When an application that is not included in the secure application list is executed, the processor may deny generation of the secure operation information.

Figure 14:
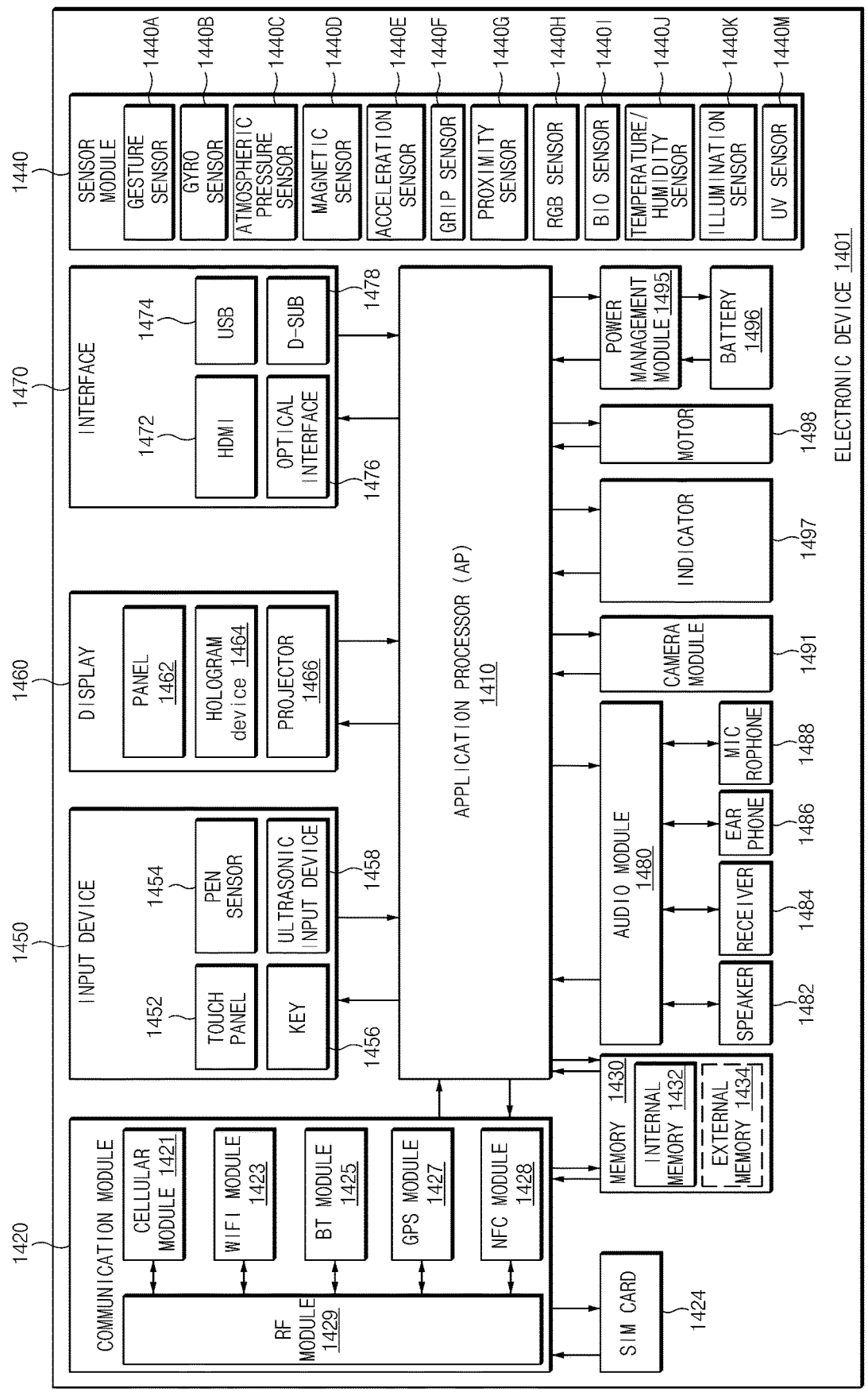
FIG. 14 is a block diagram illustrating a configuration of a program module according to an embodiment of the present disclosure.

FIG. 14 is a block diagram illustrating a configuration of a program module according to an embodiment of the present disclosure.

Referring to FIG. 14, an electronic device 1401 may include, for example, all or some of an electronic device 100 shown in FIG. 1. The electronic device 1401 includes one or more application processors (APs) 1410, a communication module 1420, a subscriber identification module (SIM) card 1424, a memory 1430, a sensor module 1440, an input device 1450, a display 1460, an interface 1470, an audio module 1480, a camera module 1491, a power management module 1495, a battery 1496, an indicator 1497, and a motor 1498.

The AP 1410 may drive an operating system (OS) or an application program to control a plurality of hardware or software components connected to the AP 1410 and may process and compute a variety of data. The AP 1410 may be implemented with, for example, a system on chip (SoC). The AP 1410 may further include a graphic processing unit (GPU) and/or an image signal processor. The AP 1410 may include some of the other components (e.g., a cellular module 1421) shown in FIG. 14. The AP 1410 may load instructions or data received from at least one of other components (e.g., a non-volatile memory) into a volatile memory to process the instructions and data and may store various data in a non-volatile memory.

The communication module 1420 may have the same or similar components as those of the communication interface 170 of FIG. 1. The communication module 1420 includes, for example, a cellular module 1421, a wireless-fidelity (Wi-Fi) module 1423, a Bluetooth (BT) module 1425, a global positioning system (GPS) module 1427, a near field communication (NFC) module 1428, and a radio frequency (RF) module 1429.

The cellular module 1421 may provide, for example, a voice call service, a video call service, a text message service, or an Internet service, and the like through a communication network. The cellular module 1421 may identify and authenticate the electronic device 1401 within a communication network using the SIM card 1424. The cellular module 1421 may perform at least some of functions which may be provided by the AP 1410. The cellular module 1421 may include a communication processor (CP).

The Wi-Fi module 1423, the BT module 1425, the GPS module 1427, or the NFC module 1428 may include, for example, a processor for processing data communicated through the corresponding module. According to an embodiment of the present disclosure, two or more components of the cellular module 1421, the Wi-Fi module 1423, the BT module 1425, the GPS module 1427, or the NFC module 1428 may be included in one integrated chip (IC) or an IC package.

The RF module 1429 may communicate, for example, a communication signal (e.g., an RF signal). The RF module 1429 may include, for example, a transceiver, a power amplifier module (PAM), a frequency filter, a low noise amplifier (LNA), or an antenna, and the like. According to an embodiment of the present disclosure, at least one of the cellular module 1421, the Wi-Fi module 1423, the BT module 1425, the GPS module 1427, or the NFC module 1428 may communicate an RF signal through a separate RF module.

The SIM card 1424 may include a SIM and/or an embedded SIM. The SIM card 1424 may include unique identification information (e.g., an integrated circuit card identifier (ICCID)) or subscriber information (e.g., an international mobile subscriber identity (IMSI)).

The memory 1430 (e.g., at least one of the first memory 130 or the second memory 140 of FIG. 1) includes, for example, an embedded memory 1432 and an external memory 1434. The embedded memory 1432 may include at least one of, for example, a volatile memory (e.g., a dynamic random access memory (DRAM), a static RAM (SRAM), or a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory (e.g., a NAND flash or a NOR flash), a hard drive, or a solid state drive (SSD)).

The external memory 1434 may further include a flash drive, for example, a compact flash (CF), a secure digital (SD), a micro-SD, a mini-SD, an extreme digital (xD), or a memory stick, and the like. The external memory 1434 may be functionally and/or physically connected with the electronic device 1401 through various interfaces.

The sensor module 1440 may measure, for example, a physical quantity or may detect an operation state of the electronic device 1401. The sensor module 1440 may convert the measured or detected information to an electric signal. The sensor module 1440 includes at least one of, for example, a gesture sensor 1440A, a gyro sensor 1440B, an atmospheric pressure sensor 1440C, a magnetic sensor 1440D, an acceleration sensor 1440E, a grip sensor 1440F, a proximity sensor 1440G, a color sensor 1440H (e.g., a red, green, blue (RGB) sensor), a biosensor 1440I, a temperature/humidity sensor 1440J, an illumination sensor 1440K, and an ultraviolet (UV) sensor 1440M. Additionally or alternatively, the sensor module 1440 may further include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1440 may further include a control circuit for controlling at least one or more sensors included therein. The electronic device 1401 may further include a processor configured to control the sensor module 1440, which is a part of the AP 1410 or is independent of the AP 1410. While the AP 1410 is in a sleep state, the processor may control the sensor module 1440.

The input device 1450 includes, for example, a touch panel 1452, a (digital) pen sensor 1454, a key 1456, and an ultrasonic input unit 1458. The touch panel 1452 may use at least one of, for example, capacitive, resistive, infrared, and ultrasonic detecting methods. Also, the touch panel 1452 may further include a control circuit. The touch panel 1452 may further include a tactile layer and may provide a tactile response to a user of the electronic device 1401.

The (digital) pen sensor 1454 may be, for example, a part of a touch panel and may include a separate sheet for recognition. The key 1456 may include, for example, a physical button, an optical key, or a keypad. The ultrasonic input unit 1458 may be an input tool for generating an ultrasonic signal. The electronic device 1401 may detect a sound wave using the microphone 1488 through the input tool and may verify data.

The display module 1460 (e.g., the display 160 of FIG. 1) may include a panel 1462, a hologram device 1464, or a projector 1466. The panel 1462 may include the same or similar components as or to those of the display 160. The panel 1462 may be implemented to be, for example, flexible, transparent, or wearable. The panel 1462 and the touch panel 1452 may be integrated into one module. The hologram device 1464 may show a stereoscopic image to the air using the interference of light. The projector 1466 may project light to a screen to display an image. The screen may be located, for example inside or outside the electronic device 1401. The display 1460 may further include a control circuit for controlling the panel 1462, the hologram device 1464, or the projector 1466.

The interface 1470 may include, for example, a high-definition multimedia interface (HDMI) 1472, a universal serial bus (USB) 1474, an optical interface 1476, or a D-subminiature 1478. The interface 1470 may be included in, for example, the communication interface 170 shown in FIG. 1. Additionally or alternatively, the interface 1470 may include, for example, a mobile high definition link (MHL) interface, an SD card/multimedia card (MMC) interface, or an infrared data association (IrDA) standard interface.

The audio module 1480 may convert, for example, a sound and an electric signal in dual directions. At least some of components of the audio module 1480 may be included in, for example, the input and output interface 150 shown in FIG. 1. The audio module 1480 may process sound information input or output through, for example, a speaker 1482, a receiver 1484, an earphone 1486, the microphone 1488, and the like.

The camera module 1491 may be, for example, a device which captures a still picture and a moving picture. The camera module 1491 may include one or more image sensors (e.g., a front sensor or a rear sensor), a lens, an image signal processor (ISP), or a flash (e.g., an LED or a xenon lamp).

The power management module 1495 may manage, for example, power of the electronic device 1401. The power management module 1495 may include a power management integrated circuit (PMIC), a charger IC, or a battery gauge. The PMIC may have a wired and/or wireless charging method. The wireless charging method may include, for example, a magnetic resonance method, a magnetic induction method, or an electromagnetic method. An additional circuit for wireless charging, for example, a coil loop, a resonance circuit, or a rectifier, and the like may be further provided. The battery gauge may measure, for example, the remaining capacity of the battery 1496 and voltage, current, or temperature thereof while the battery 1496 is charged. The battery 1496 may include, for example, a rechargeable battery and/or a solar battery.

The indicator 1497 may display a specific state of the electronic device 1401 or a part (e.g., the AP 1410) thereof, for example, a booting state, a message state, or a charging state, and the like. The motor 1498 may convert an electric signal to mechanical vibration and may generate vibration or a haptic effect, and the like. Though not shown, the electronic device 1401 may include a processing unit (e.g., a GPU) for supporting a mobile TV. The processing unit for supporting the mobile TV may process media data according to standards, such as a digital multimedia broadcasting (DMB) standard, a digital video broadcasting (DVB) standard, or a media flow standard, and the like.

Each of the above-mentioned elements of the electronic device described herein may be configured with one or more components, and names of the corresponding elements may be changed according to the type of the electronic device. The electronic device may include at least one of the elements described herein, some elements may be omitted from the electronic device, or other additional elements may be further included in the electronic device. Also, some of the elements of the electronic device according to an embodiment of the present disclosure may be combined with each other to form one entity, thereby making it possible to perform the functions of the corresponding elements in the same manner as before the combination.

The term "module", as used herein may refer to, for example, a unit including at least one of hardware, software, and firmware. The term "module" may be interchangeably used with, for example, terminologies "unit", "logic", "logical block", "component", or "circuit", and the like. A module may be a minimum unit of an integrated component or a part thereof. A module may be a minimum unit performing one or more functions or a part thereof. A module may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

At least a part of a device (e.g., modules or the functions) or a method (e.g., operations) may be implemented with, for example, instructions stored in a computer-readable storage media which has a program module. If the instructions are executed by one or more processors, the one or more processors may perform functions corresponding to the instructions. The computer-readable storage media may be, for example, the memory.

The computer-readable storage media may include a first zone configured to operate secure operation information, a second zone configured to store seed information necessary for generating the secure operation information and to have a higher secure level than that of the first zone, at least one instruction set to generate the secure operation information according to the seed information in response to a request of the first zone and to transmit the generated secure operation information to the first zone, and at least one processor configured to support execution of the at least one instruction.

When connecting with a predetermined server or receiving a request for executing a predetermined application, the processor may output the input and output interface 150 for transmitting a request for generating the secure operation information.

The computer-readable storage media may include a hard disc, a floppy disk, magnetic media (e.g., a magnetic tape), optical media (e.g., a compact disc read only memory (CD-ROM)), a digital versatile disc (DVD), magneto-optical media (e.g., a floptical disk), and a hardware device (e.g., a ROM, a random access memory (RAM), or a flash memory, and the like), and the like. The program instructions may include, not only mechanical codes compiled by a compiler, but also high-level language codes which may be executed by a computer using an interpreter and the like. The above-described hardware device may be configured to operate as one or more software modules to perform operations according to an embodiment of the present disclosure, and vice versa.

Modules or program modules according to an embodiment of the present disclosure may include at least one or more of the above-mentioned components, some of the above-described components may be omitted, or other additional components may be further included therein. Operations executed by modules, program modules, or other elements may be executed by a successive method, a parallel method, a repeated method, or a heuristic method. Some of the operations may be executed in a different order or may be omitted, and other operations may be added.

As described above, according to an embodiment of the present disclosure, the electronic device may provide a more stable security function.

According to an embodiment of the present disclosure, the electronic device may easily operate secure information.

While the disclosure has been shown and described with reference to certain embodiments thereof, it will be understood by those skilled in the art that various changes in form and detail may be made therein without departing from the spirit and scope of the disclosure as defined by the appended claims and their equivalents.

What is claimed is:

1. An electronic device, comprising:
a housing;
a memory configured to be located in the housing;
a user interface; and
a processor configured to electrically connect with the memory and the user interface,
wherein the memory comprises a first zone and a second zone, such that the second zone has a higher level of security than a level of security of the first zone,
wherein the memory stores instructions that when executed by the processor, instruct the processor to:
receive user input information to request generation of a one time password (OTP) based on the first zone, receive token information from outside of the electronic device based on the first zone, at least temporarily store the received token information in the first zone, extract seed information from the token information based on the first zone, transmit the seed information extracted from the token information to the second zone, store the seed information in the second zone, and decrypt and use the seed information when receiving a request for using the seed information, and
wherein the seed information is for generating information comprising the OTP.

2. The electronic device of claim 1, wherein the token information corresponds to a direct data scheme.

3. The electronic device of claim 1, wherein the instructions are set such that the processor stores a secure application list in the first zone to provide support in processing the information comprising the OTP with a server or an application.

4. The electronic device of claim 1, wherein each of the instructions is set such that the processor verifies a validity of at least one of the first zone or the second zone.

5. The electronic device of claim 4, wherein each of the instructions is set such that the processor does not process the information comprising the OTP, if the at least one of the first zone or the second zone is invalid.

6. The electronic device of claim 1, wherein each of the instructions is set such that the processor decrypts the seed information and stores the decrypted seed information in the second zone.

7. The electronic device of claim 1, wherein each of the instructions is set such that the processor stores encrypted seed information in the second zone.

8. The electronic device of claim 1, wherein the memory comprises a first memory and a second memory configured to be disposed apart from the first memory,
wherein the first zone is set in the first memory, and
wherein the second zone is set in the second memory.

9. The electronic device of claim 1, wherein each of the instructions is set such that the processor stores, in the first zone, information extracted based on the first information mapped with the second information.

10. A method for operating an electronic device, the method comprising:
receiving user input information to request generation of a one time password (OTP) from a user interface based on a first zone of a memory of the electronic device;
obtaining token information in the first zone of the memory;
extracting seed information from the token information in the first zone of the memory;
transmitting the seed information extracted from the token information to a second zone of the memory, the second zone having a higher level security than a level of security of the first zone;
storing the seed information in the second zone of the memory; and
decrypting and using the seed information when receiving a request for using the seed information,
wherein the seed information is for generating information comprising the OTP.

11. The method of claim 10, further comprising:
storing, in the first zone, information extracted based on the first information mapped with the second information.

12. The method of claim 10, further comprising:
storing a secure application list in the first zone to provide support in processing the information comprising the OTP with a server or an application.

13. The method of claim 12, further comprising:
generating the information comprising the OTP when an application included in the secure application list is executed; and
refraining from generating the information comprising the OTP when an application that is not included in the secure application list is executed.

14. The method of claim 10, further comprising:
verifying a validity of at least one of the first zone and the second zone; and
refraining from processing the information comprising the OTP, if the at least one of the first zone and the second zone is invalid.

15. The method of claim 10, wherein storing the second information further comprises:
storing encrypted seed information in the second zone and providing the decrypted seed information when receiving a request for the encrypted seed information.

16. The method of claim 10, further comprising:
receiving a request to generate information in the first zone;
generating at least one of time-based information and event-based information based on the seed information; and
transmitting the generated at least one of the time-based information and the event-based information to the first zone.

* * * * *